United States Patent [19]
Eshel et al.

[11] Patent Number: 5,535,375
[45] Date of Patent: Jul. 9, 1996

[54] FILE MANAGER FOR FILES SHARED BY HETEROGENEOUS CLIENTS

[75] Inventors: Marc M. Eshel, Tarrytown; Guerney D. H. Hunt, Ithaca; Donald N. Jones; Christopher Meyer, both of Vestal; Frederick A. Schwartz, Binghamton, all of N.Y.

[73] Assignee: International Business Machines Corporation, Armonk, N.Y.

[21] Appl. No.: 320,768

[22] Filed: Oct. 11, 1994

Related U.S. Application Data

[63] Continuation of Ser. No. 871,204, Apr. 20, 1992, abandoned.

[51] Int. Cl.$^6$ .................................. G06F 15/16
[52] U.S. Cl. .................. 391/500; 364/940.81; 364/240.8
[58] Field of Search ........................... 395/200.01, 375, 395/500, 650

[56] References Cited

U.S. PATENT DOCUMENTS

| Re. 33,426 | 11/1990 | Sugimoto et al. | 370/85.14 |
|---|---|---|---|
| 3,735,360 | 6/1973 | Anderson | 364/DIG. 1 |
| 3,889,237 | 6/1975 | Alferness | 364/DIG. 1 |
| 4,281,315 | 7/1981 | Bauer | 364/DIG. 1 |
| 4,513,373 | 4/1985 | Sheets | 364/200 |
| 4,597,078 | 6/1986 | Kempf | 370/94 |
| 4,627,052 | 12/1986 | Hoare et al. | 370/88 |
| 4,648,061 | 3/1987 | Foster | 364/DIG. 2 |
| 4,680,756 | 7/1987 | Sugimoto et al. | 370/88 |
| 4,780,821 | 10/1988 | Crossley | 364/200 |
| 4,811,337 | 3/1989 | Hart | 370/85 |
| 4,831,620 | 5/1989 | Conway et al. | 370/85 |
| 4,975,906 | 12/1990 | Takiyasu | 370/85.13 |
| 4,989,139 | 1/1991 | Friedman et al. | 364/200 |
| 5,007,017 | 4/1991 | Kobayashi | 364/900 |
| 5,031,174 | 7/1991 | Natsume | 370/85.5 |

FOREIGN PATENT DOCUMENTS

| 0350654 | 1/1990 | European Pat. Off. . |
|---|---|---|
| 0449494 | 10/1991 | European Pat. Off. . |

OTHER PUBLICATIONS

IBM TDB, vol. 30, No. 11, Apr. 1988, pp. 471–472, J. J. Hoard, "Inter–Local Area Network Device Sharing By Concatenation of Higher–Level Network Protocols".

IBM TDB, vol. 26, No. 7A, Dec. 1983, pp.3483–3484, R. A. Pascoe, "Interconnecting Devices of Different Communication Protocols".

IBM TDB, vol. 33, No. 6A, Nov. 1990, p. 235, G. H. Schaefer et al., "Changing Between Different Lan Environments".

IBM TDB, vol. 33, No. 7, Dec. 1990, pp. 63–68, R. C. Dixon et al., "Bridge For Interconnecting Local Area Networks Having Different Architectures".

(List continued on next page.)

*Primary Examiner*—David Y. Eng
*Attorney, Agent, or Firm*—Arthur J. Samodovitz

[57] ABSTRACT

A computer system manages files shared by first and second heterogeneous clients. The first client exhibits a first protocol such as SMB and the second client exhibits a second, different protocol such as NFS. A first protocol converter receives requests from the first client to create, read and update the files, and converts the requests to corresponding requests exhibiting a common protocol. A second protocol converter receives requests from the second client to create, read and update the files, and converts the requests to corresponding requests exhibiting the common protocol. A file manager is common to both clients and both protocol converters, receives the converted requests exhibiting the common protocol and executes the requests in a name space and data area which are both common to the first and second clients. The name space stores names of the files and the data area stores the files. The file manager provides access by each of the clients to files and names of the files created by the other client. A common lock manager is provided for the common name space and common data area. The system also supports second and third name spaces and data areas dedicated to the first and second clients, respectively.

11 Claims, 20 Drawing Sheets

OTHER PUBLICATIONS

IBM TDB, vol. 29, No. 2, Jul. 1986, pp. 912–913, T. J. Freund et al., "Gateway Session Connection–Protocol Independent of Lan".

IBM TDB, vol. 30, No. 5, Oct. 1987, pp. 282–284, J. J. Dorak et al., "Media Sharing Among Local Area Networks".

IBM TDB, vol. 30, No. 12, May 1988, pp. 289–290, Y. Iguchi et al., "Burn–In Of Integrated Circuits at Wafer Level By Light–Switching Drivers".

IBM TDB, vol. 29, No. 9, Feb. 1987, pp. 3767–3768, M. H. Linehan, "Multiple–Protocol LAN Interface For IBM 370 Systems".

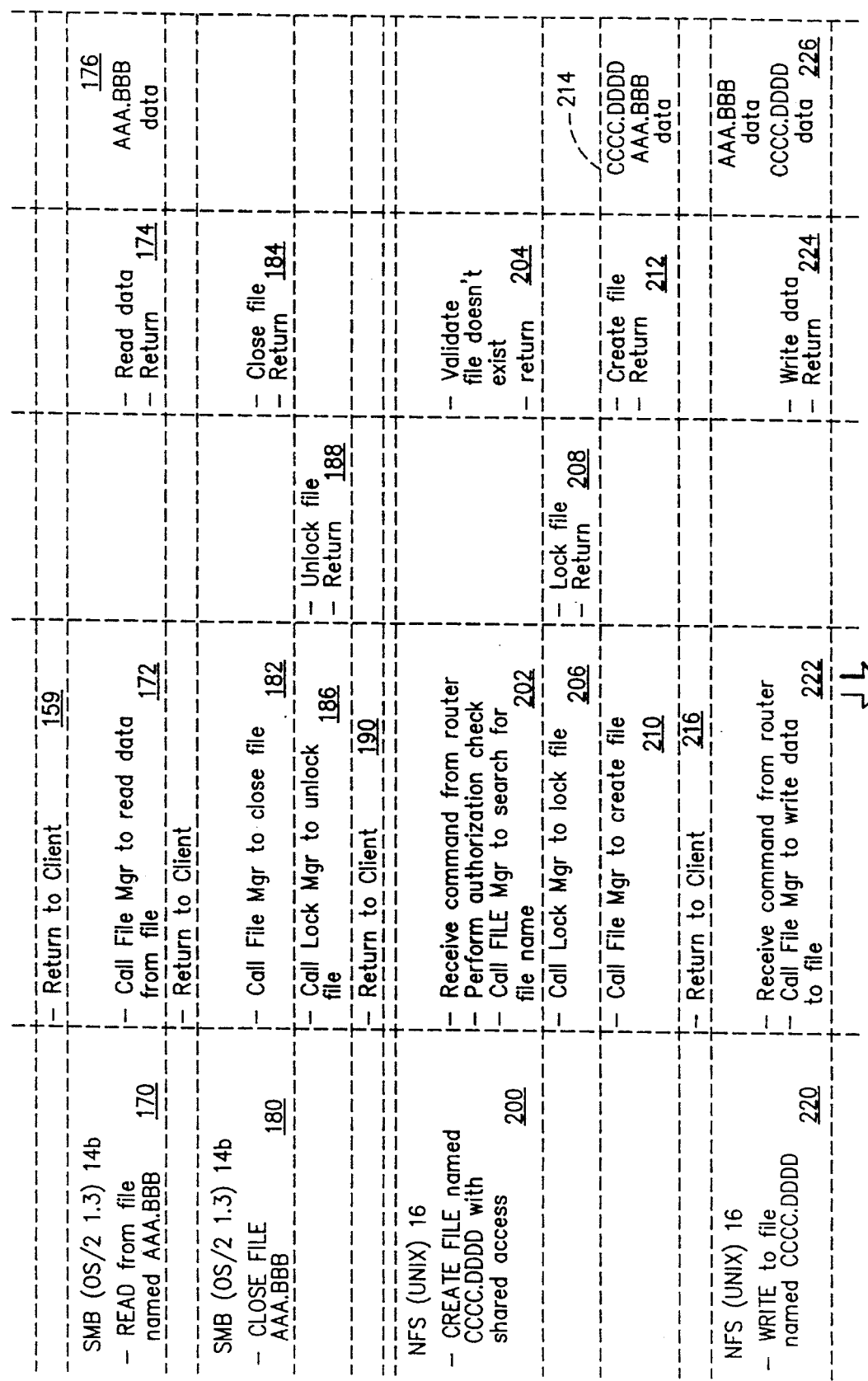

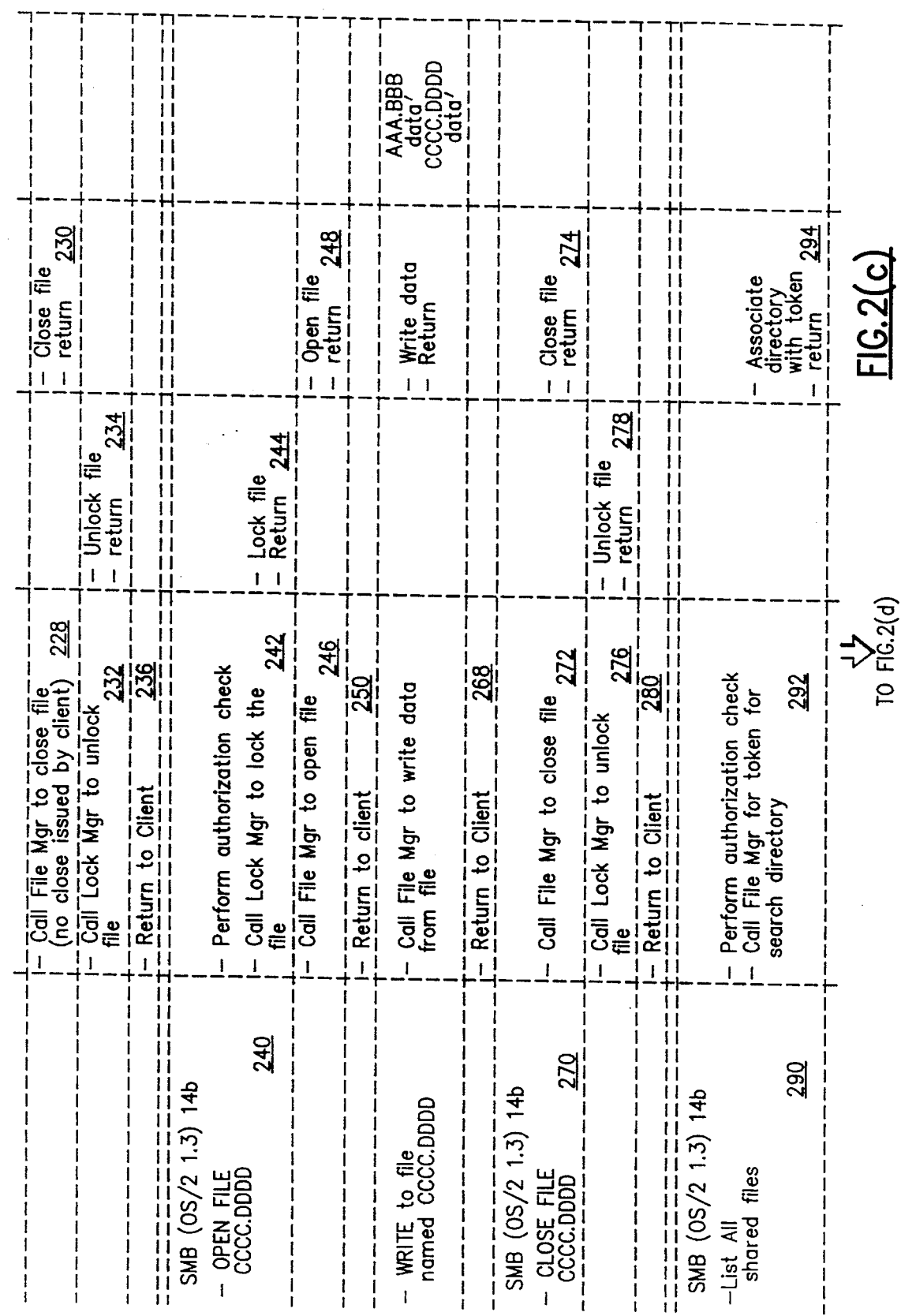

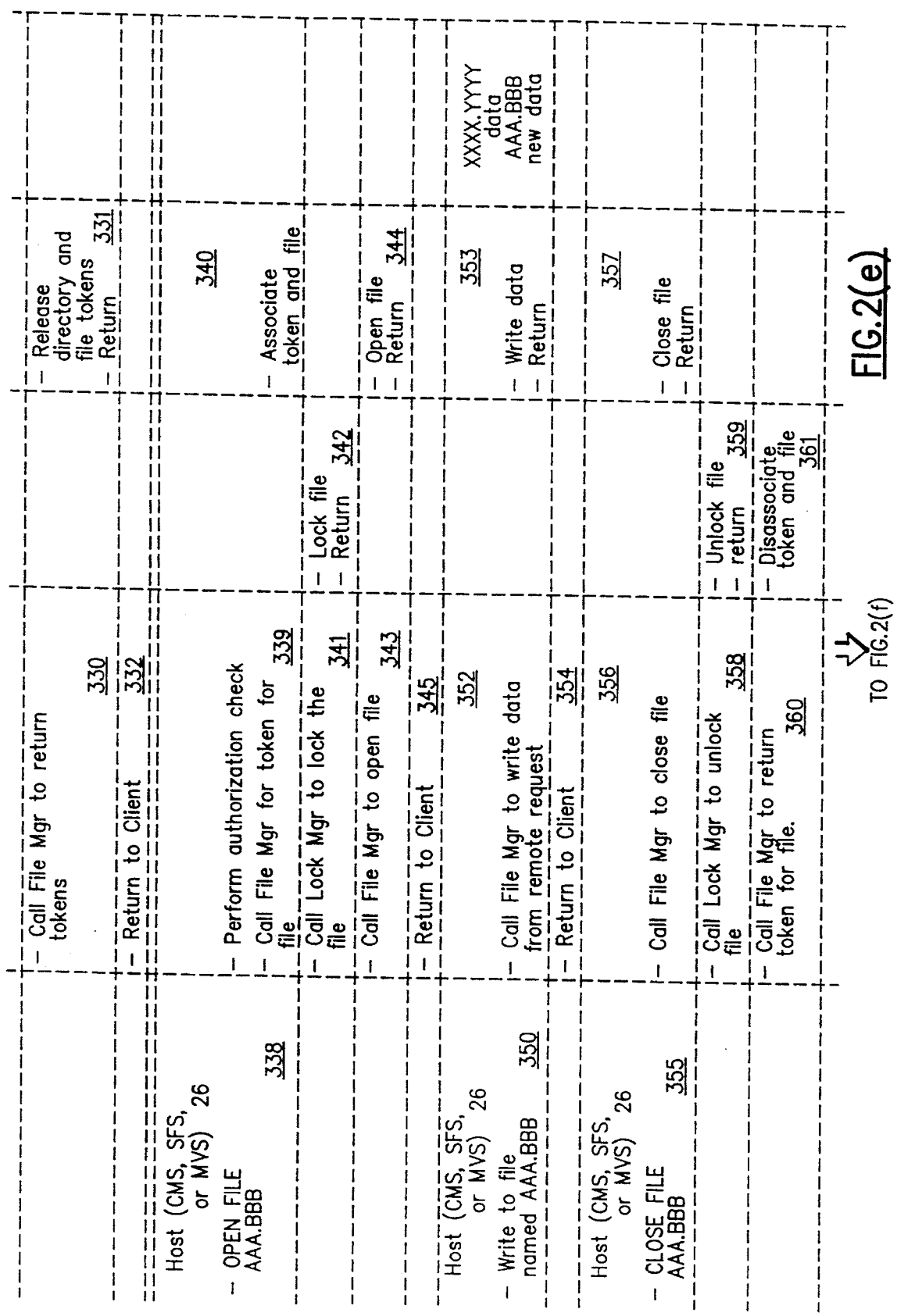

FILE MANAGER FOR FILES SHARED BY HETEROGENEOUS CLIENTS

The application is a continuation of application Ser. No. 07/871,204, filed Apr. 20, 1992 now abandoned.

BACKGROUND OF THE INVENTION

The invention relates generally to computer systems and networks, and deals more particularly with a file manager for files which are shared by heterogeneous clients that exhibit different communication protocols.

A local area network (LAN) was previously known which includes multiple homogeneous clients and a network server. For example, the clients on one network can all exhibit a network file system (NFS) protocol or can all exhibit a server message block (SMB) protocol. Each of the clients comprises a personal computer or workstation with an operating system such as an IBM DOS or AT&T UNIX operating system or IBM OS/2 operating system, and a network adapter card (such as a Token-ring or Ethernet adapter card) and a client program which interfaces the personal computer or workstation to the other clients and the network server. The network server also comprises a personal computer or workstation with an operating system such as IBM OS/2 operating system or a Novell Netware operating system, and a network adapter card and a network server program which interfaces the personal computer or workstation of the network server to the other clients and provides various services to the clients. For example, the network server manages a common storage disk, printer and modem. Thus, any of the clients can read from and write to a common directory and common files which are stored on the common storage disk, use the printer and communicate over the modem.

An IBM VM/ECF program executing in an IBM System/370 host computer was also previously known which provides services to multiple homogeneous clients exhibiting a Server-Requester Programming Interface (SRPI) protocol. In this system, each client is logically coupled to, assigned to and serviced by a different virtual machine within the host computer, and the virtual machine for each client manages a resource or resources dedicated to the client.

An IBM VM/NFS program executing in an IBM System/370 host computer was also previously known which provides services to multiple homogeneous clients exhibiting an NFS protocol. In this system, each client can communicate with one or more host computers to obtain services from the host computer. For example, each of the host computers provides a file manager common to all of the clients. The common file manager services NFS client requests by transforming the NFS protocol to a CMS protocol. However, the file manager supports only those NFS data formats which are compatible with CMS.

Another previously known Novell Netware 3.1 computer network comprises two local area networks, one supporting clients which all exhibit the NFS protocol and execute AT&T's Unix operating system, and the other supporting clients which all exhibit a Novell SPX protocol and execute DOS or OS/2 operating system. Alternately, the different clients can all reside in the same network. Each of the networks or the sole network in the alternate case is coupled to a common server which has a different protocol converter for each client protocol type, in the foregoing example, one for the NFS protocol clients, and the other for the SPX clients. Each of the protocol converters interprets the requests from the respective client types and performs the file system operation. While there is one file manager for all protocol converters and client types, there is a separate file name space for the names of files created by the clients of each protocol type. The file name spaces also include pointers from each file name in the name space to a storage location on a common disk. The file manager supports a request by a human network service administrator to link the file names in one file name space to the other file name space. Pursuant to such a request, the file manager will copy the names and associated pointers from the one name space to the other name space. After such linking, the clients associated with this other name space can read, change or delete the file names in this other name space and read from and write to the files which were linked from the one name space. Nevertheless, the clients associated with this other name space cannot access the one name space and probably not delete files which were linked from the one name space. Also, this system inlcudes a lock manager (or managers) which associates locks with file names within one name space only. Consequently, if the lock manager is called to place a lock on a file or file name (in one name space) that is the subject of a client request, the file name is not locked on the other name space so that clients associated with this other name space can simultaneously access the same file. The lock is only effective against clients of the same type or the client that made the request causing the lock to be established, and which use the same name space.

A general object of the present invention is to provide a system for true sharing of files between heterogeneous clients.

Another general object of the present invention is to provide a system of the foregoing type which includes a true lock manager.

Another object of the present invention is to provide a system of the foregoing type which also supports files which are dedicated to each client.

SUMMARY OF THE INVENTION

The invention resides in a computer system for managing files or other data objects shared by first and second heterogeneous clients. The first client exhibits a first protocol and the second client exhibits a second, different protocol. The system comprises a first protocol converter which receives requests from the first client to create, read and update the files or other data objects, and converts the requests to corresponding requests in a common protocol. The system also comprises a second protocol converter which receives requests from the second client to create, read and update the files or other data objects, and converts the requests to corresponding requests in the common protocol. The system also comprises a file manager common to both clients and both protocol converters, which receives the converted requests exhibiting the common protocol and executes the requests in a name space and data area which are both common to the first and second clients. The name space stores names of the files or other data objects and the data area stores the files or other data objects. The file manager provides access by each of the clients to names of files or other data objects created by the other client, and access by each of the clients to the files or other data objects written by the other client.

According to one feature of the present invention, the system further comprises a common lock manager for the common name space and common data area.

According to another feature of the present invention, the system further comprises a second name space for names of other files or other data objects and a second data area for storing these other files or other data objects. The second name space and second data area are dedicated to the first client and not accessible by the second client. The first protocol converter receives requests from the first client to access the second name space and second data area, converts the requests to the common protocol, and passes the converted requests to the file manager for execution. The system also comprises a third name space for names of other files or other data objects and a third data area for storing these other files or other data objects. The third name space and third data area are dedicated to the second client and not accessible by the first client. The second protocol converter receives requests from the second client to access the third name space and third data area, converts the requests to the common protocol, and passes the converted requests to the file manager for execution.

DETAILED DESCRIPTION OF THE PREFERRED EMBODIMENTS

Figure 1:
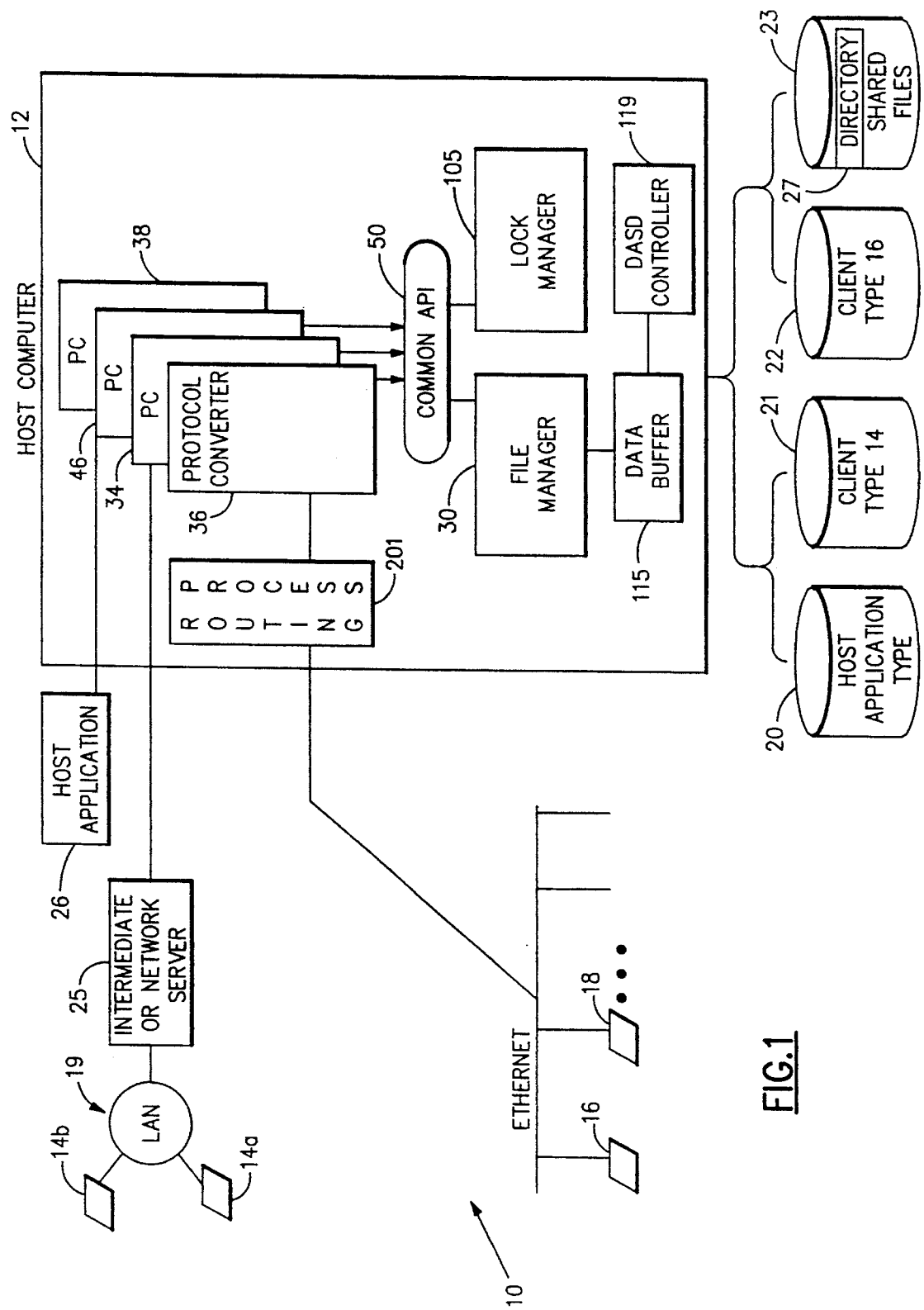
FIG. 1 is a block diagram of a host computer which includes a file manager and lock manager according to the present invention, and heterogeneous clients served by the file manager and lock manager.

Referring now to the drawings in detail wherein like reference numerals indicate like elements throughout the several views, FIG. 1 illustrates a computer network generally designated 10 which comprises a host computer 12 according to the present invention, and multiple heterogeneous clients 14a,b, 16 and 18 coupled to the host computer. Clients 14a,b exhibit one type of protocol such as SMB, client 16 exhibits another type of protocol such as NFS, and client 18 exhibits still another type of protocol such as AFS by Transarc Corp, SPX or AFP by Apple Computer Co. However, in the illustrated example, client 14a exhibits a DOS or OS/2 1.1 subtype of SMB protocol and client 14b exhibits an OS/2 1.2 subtype of SMB protocol. A "protocol" has three components, i.e. rules of communication, command format and data format. The rules of communication define what operations are expected from each type of command, the sequence of the operations and replies or returns to the requestor after each operation is performed. Specific command and data formats are described below.

Each of the clients 14a,b comprises a personal computer or workstation with an adapter card such as a Token-Ring adapter card and a client portion of network code such as IBM PC LAN Program or IBM DOS LAN Requester program to permit the personal computer or workstation to interface to the other clients and a network server 25. The network server also comprises a personal computer or workstation with a Token-Ring adapter card and a server portion of network code such as an IBM OS/2 LAN Server 2.0 program. The network server provides various services to the clients including communication to host computer 12. To support such communication, the network server includes a previously known parallel channel adapter (PCA) card (which is available from International Business Machines Corp.) and the host computer 12 includes a Block Multiplexor Channel which is described in detail in a document entitled System/370 Principles of Operation which is available from International Business Machines Corp. at Mechanicsburg, Pa. by order number GA22-7000. The PCA card is also described in copending patent application entitled "Network Server For Local And Remote Resources", Ser. No. 07/870,026 filed Apr. 17, 1992, by Donald N. Jones et al., which patent application is hereby incorporated by reference as part of the present disclosure. Each of the clients 16 and 18 comprises a personal computer or workstation with an adapter card such as an Ethernet adapter card and a client portion of network code to permit the personal computer or workstation to interface to the other client. The clients 16 and 18 are coupled to the host computer 12 by a TCP/IP communication link.

By way of example, host computer 12 is an IBM System/370 or System/390 computer with a VM/ESA operating system. Host computer 12 manages direct access storage devices (DASDs) 20–23 for access by the clients 14a,b, 16 and 18 and a host application program 26. In the illustrated embodiment, DASD 20 stores directories and files in a data format native to the host computer, for example, a CMS data format using EBCDIC characters.

The host application program 26 uses a CMS protocol (i.e. CMS communication rules, a CMS command format and the CMS data format), and can access DASD 20 via a protocol converter 46 and file (and directory) manager 30. The CMS command format uses file system comands and/or macros such as FSOPEN, FSCLOSE, FSREAD, FSWRITE, or the callable services library functions such as DMSOPEN, which are documented in the VM/ESA Application Reference, from IBM Corp. in Mechanicsburg, Pa. (order number ST00-5036).

The CMS data format for file name and other data has the following limitations: eight characters per file name, eight characters per file type, upper case letters, and other characters as set forth in the aforementioned VM/ESA Application Reference, and no hierarchical directories. Only the host application can access the directories and files in DASD 20. Such access is made via a file manager 30 and protocol converter 46 which provides a communication rule conversion and a command format conversion to common communication rules and common command format of a common application program interface (API) 50. The protocol converter calls the file manager 30 to access DASD 20 using the common API protocol. There is no dat format conversion because the data is stored in the CMS data format.

DASD 21 stores directories and files in the DOS and OS/2 1.1 SMB data format for all SMB clients. As noted above, the clients 14a,b use the SMB protocol. The SMB command format comprises a header format which is common to all types of commands and a parameter format which varies based on the type of parameter. The parameter format is described in the documents entitled "Microsoft Networks/OpenNET File Sharing Protocol", Intel Part Number 138446 Version 1.9, Apr. 21, 1987, Microsoft Corporation, Intel Corporation; "Microsoft Networks SMB FILE SHARING PROTOCOL EXTENSIONS: SMB File Sharing Protocol Extensions Version 2.0", Document Version 3.2, Jul. 13, 1988, Microsoft Corporation; and "Microsoft Networks SMB FILE SHARING PROTOCOL EXENTSIONS: SMB File Sharing Protocol Extensions Version 3.0", Document Version 1.09, Nov. 29, 1989, Microsoft Corporation. The header format is as follows:

identifier of this command strucutre i.e. "SMB"
network request or command code
space for return code and error class when sending response
flags to qualify operation
additional flags to qualify operation
flags reserved for host use to qualify operation
fields used to identify a source, tree ID, caller's process ID, user ID in user level security mode
   network (or host) server supplied tokens or handles for resource connection, account name, file name, and multiplexing correlation constant
multiplex ID for request and response correlation The SMB data format uses ASCII characters with the following limitations: the DOS and OS/2 1.1 subtype require a file name with a maximum of eight characters, a period, and then a file type with a maximum of three characters; the OS/2 1.2 subtype permit a file name with a maximum of two hundred fifty five characters (and do not require a period or file type) per file name. The allowable characters in a file name are, for OS/2 1.2 clients, upper case alphabetic, numberic, and any special characters except:

" (double quote)
: (colon)
> (greater-than sign)
< (less-than sign)
| (or-bar)
/ (forward slash)
\ (backward slash)
* (asterick)
? (question mark)

For DOS clients, upper case alphabetic characters, numeric charactrs (0–9) and any special characters except:

" (double quote)
: (colon)
> (greater-than sign)
< (less-than sign)
| (or-bar)
/ (forward slash)
\ (backward slash)
* (asterick)
? (question mark)
. (period)
[ (left bracket)
] (right bracket)
+ (plus sign)
= (equal sign)
; (semicolon)
, (comma)

Only the SMB clients 14a,b can access the directories and files in DASD 21. Such access is made via file manager 30 and a protocol converter 34 which provides a communication rule conversion and a command format conversion to the communication rules and comand format of the common API. The protocol converter 34 calls the file manager 30 to access DASD 21 using the common API protocol. There is no data format conversion because the data is stored in SMB data format.

DASD 22 stores directories and files in the NFS format. As noted above, the client 16 uses the NFS protocol (including the NFS rules of communication, NFS command format and NFS data format). The NFS protocol and accompanying data representations are documented in the following Internet "Request For Comments" (RFC) documents:

for NFS— RFC # 1094
   for RPC— RFC # 1057
   for XDR (External Data Representation): RF # 1014.

The NFS data format uses ASCII characters with much freedom, i.e. lower case letters, capital letters and mixed letters, a maximum of two hundred fifty-five characters per file name and alphanumeric and symbolic characters are permitted. Only the NFS client 16 can access the directories and files in DASD 22. Such access is made via file manager 30 and a protocol converter 36 which provides communication rule conversion and command format conversion to the communication rules and command format of the common API. The protocol converter 36 calls the file manager to access DASD 22 using the common API protocol. Ther is no data format conversion because the data is stored in NFS format.

DASD 23 stores directories and files in a common data format. The common data format uses ASCII characters, and includes the following capabilities: file names may consit only of the DOS SMB character set, but names may be up to 255 characters long. Hierarchical directories are maintained. Any of the clients and host application program can access the directories and files in DASD 23 such that the directories and files are "shared", and such access is made via file manager 30 and a respective protocol converter 34, 36 or 38 corresponding to the type of client 14a,b, 16 or 18, and protocol converter 46 for host application program 26. The protocol converters call the file manager 30 to access DASD 23 using the common API protocol. However, a file name will not be furnished to a client if the syntax of the file name cannot be accepted by the client. For example, if the DOS or OS/2 1.1 SMB client type requests to read the directory, and the directory includes a file name with more than eight characters or no period with at least one character on either side, or more than three characters after the period, then the protocol converter will not include such a file name in the directory listing that is sent to the SMB client. The directories are stored in a common name space 27 within DASD 23.

According to one object of the present invention, the heterogeneous clients 14a,b, 16 and 18 and host application program 26 can all access the shared directories and files in DASD 23, as soon as they are written (and the writer completes its access if the other access is conflicting), and the shared access is total, i.e. as if the client created the file in its dedicated DASD. The clients make the access requests and receive replies without any change to the normal protocols exhibited by these clients and host application program. The protocol converters 34, 36, 38 and 46 make the necessary conversion of protocol to that of the common API 50 for the file manager 30. The data format for the common API is described above. The command formats for the major commands of the common API followed by the respective return formats are as follows:

```
Command:  locate
             path token to locate directory that contains the
              file
             file name
Return:   token for file name
          file token
          successful or unsuccessful search code:
Command:   open
             file token
Return:   file attributes;
```

```
Command:    read
            file token
            read parameter list, i.e. offset into the file to
                start reading, number of bytes to read
                pointer to data buffer
Return:     data;
Command:    write
            file token
            write parameter list, i.e. offset into file to
                start writing and number of bytes to write
                and pointer to data to write (included in
                request)
Return:     successful or unsuccessful code;
Command:    close
            file token
Return:     successful or unsuccessful code;
Command:    create
            file token name
            attributes
Return:     successful or unsuccessful code;
Command:    lock
            file token
            access/share type, i.e. read/write exclusive
                access read/write, share read only
                access write, share write
                access write, share read
                read only, share read and write
                read only, share write
                read only, share read
                read only, share none
                write only, share read and write
                write only, share write
                write only, share read
                write only, share none
                read and write, share read and write
                read and write, share write
                read and write, share read
                read and write, share none
Return:     successful or unsuccessful code; and
Command:    unlock
            file token
Return:     successful or unsuccessful code.
```

Figure 2A:
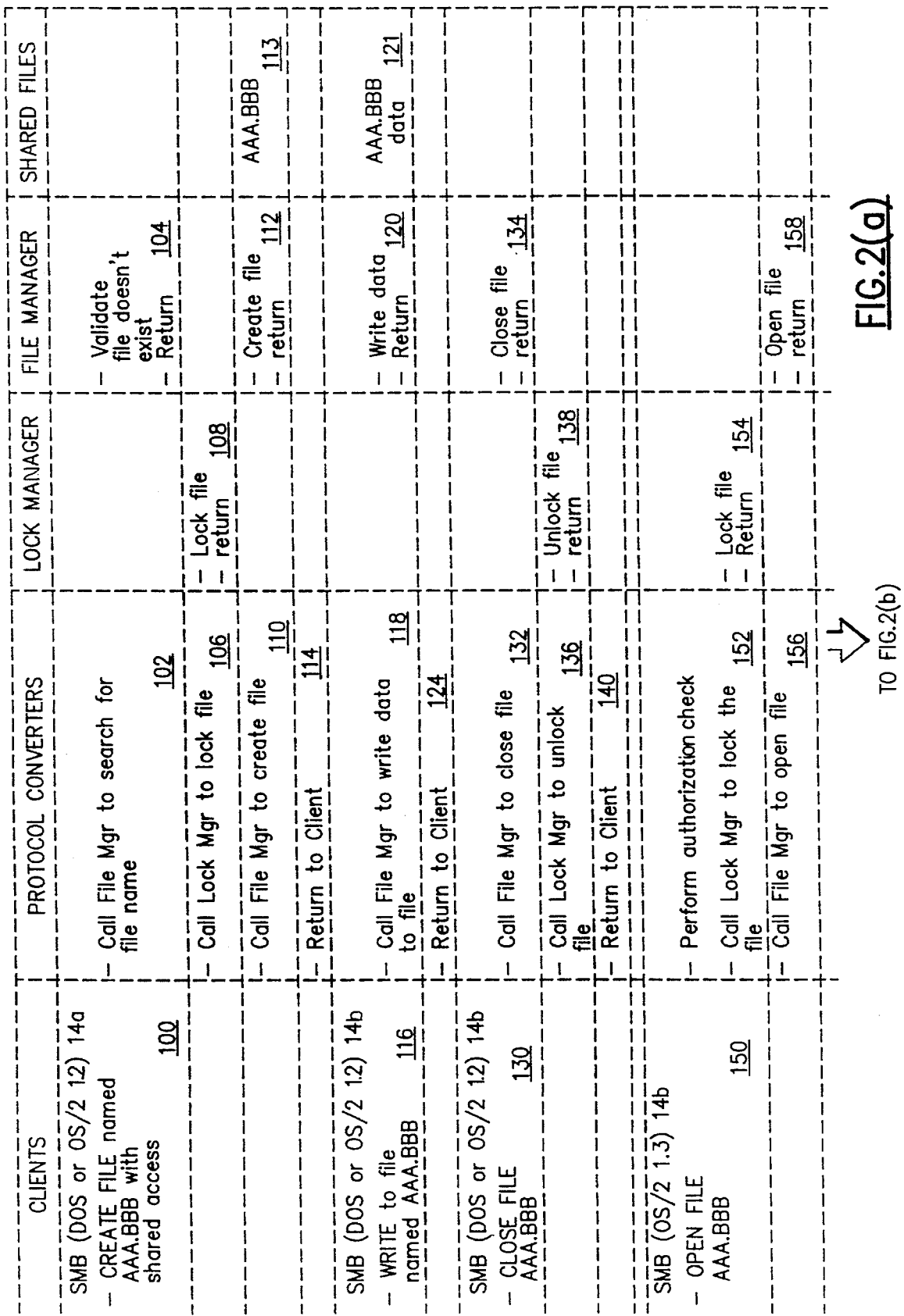
FIGS. 2(a–f) form a flow chart which illustrates operation of the file manager and lock manager of FIG. 1 in response to specific requests from the clients.
Figure 2D:
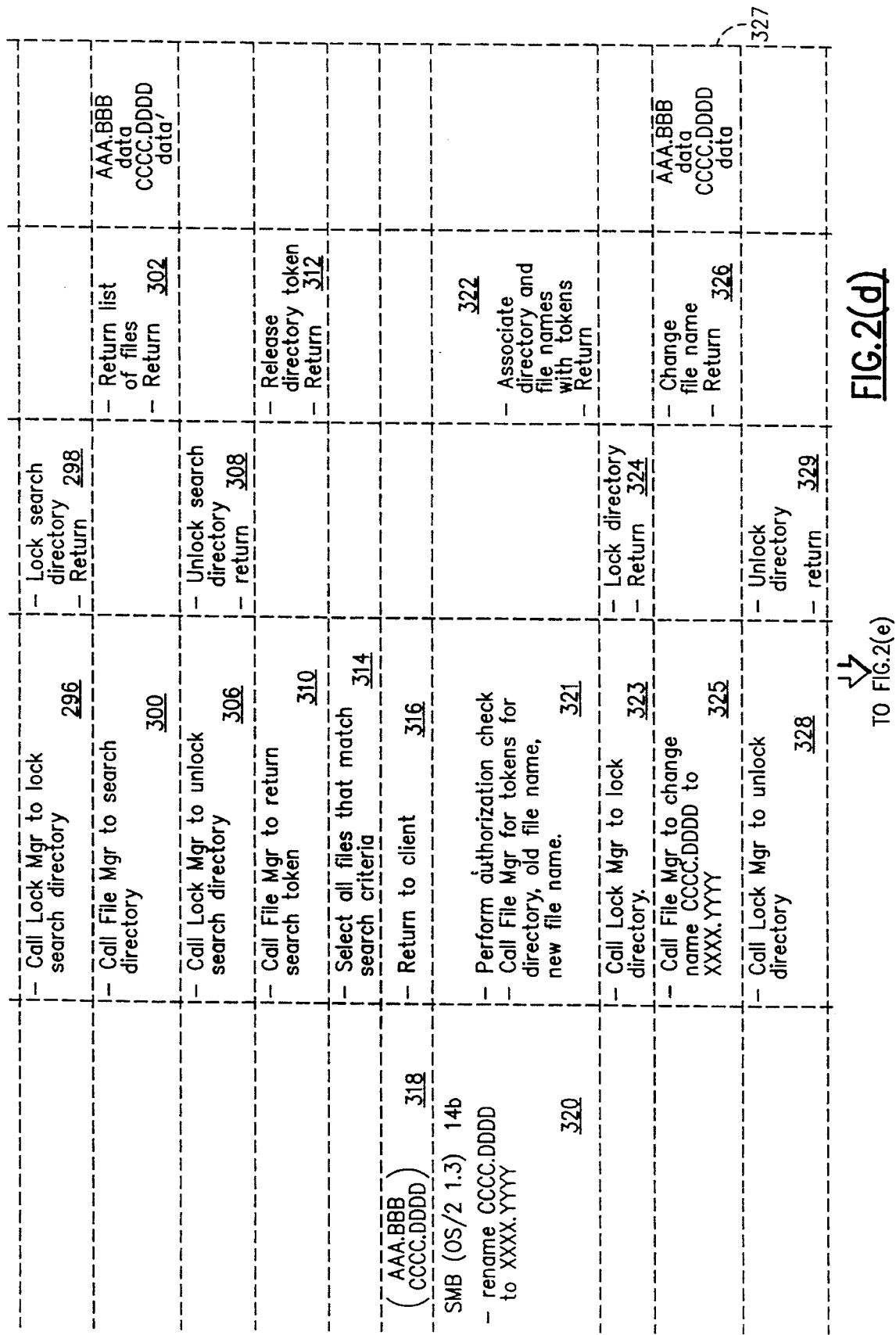
Figure 2F:
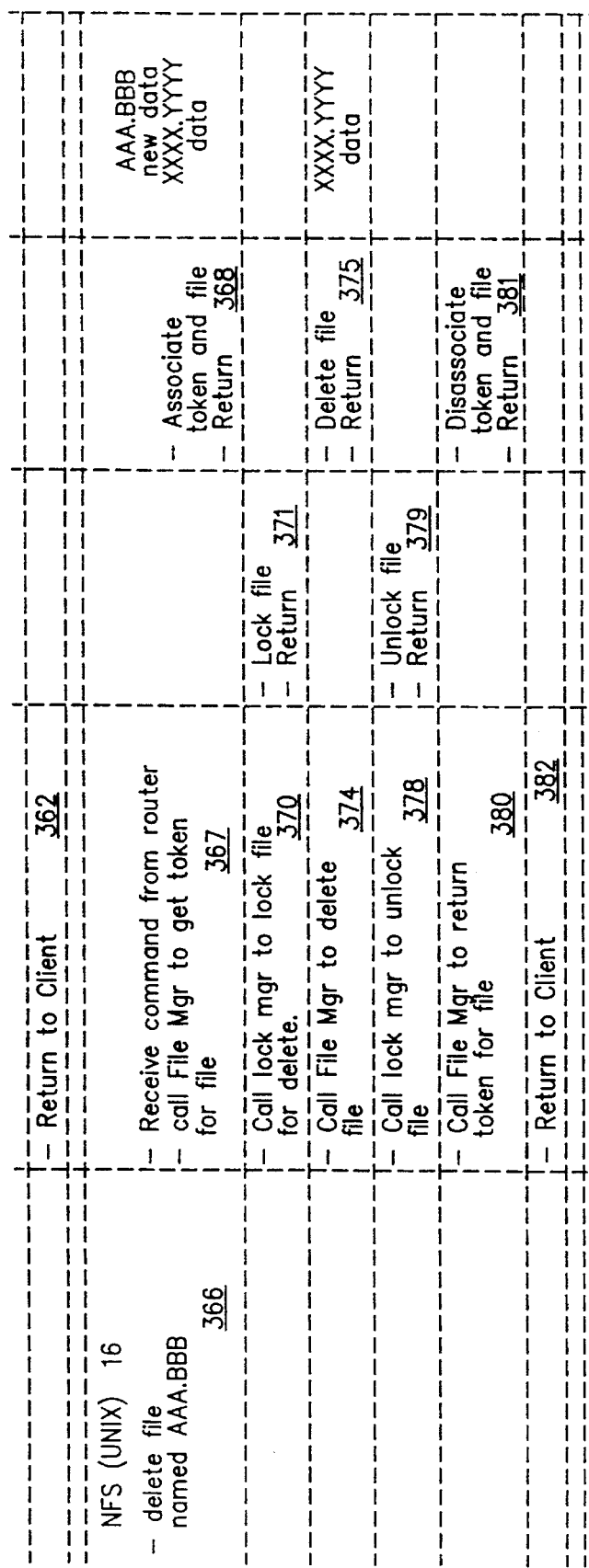
Figure 3A:
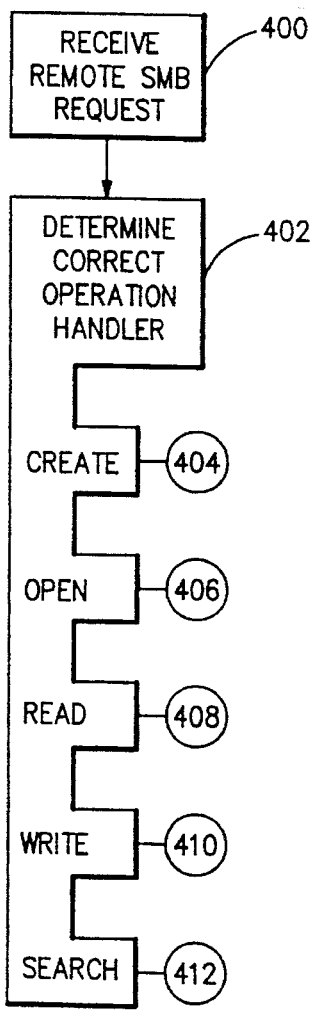
FIGS. 3(a–f) is a flow chart which illustrates general operation of an SMB type of protocol converter within the file manager of FIG. 1.
Figure 4A:
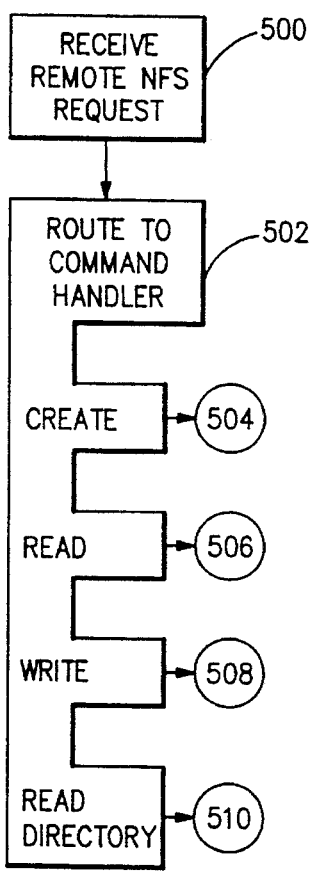
FIGS. 4(a–e) is a flow chart which illustrates general operation of an NFS type of protocol converter within the file manager of FIG. 1.

The communication rules for the principle commands are illustrated in FIG. 2(a–e) and described below. As described above, there is one protocol converter for each type of client that has access to the shared directories and files.

FIGS. 2(a–e) illustrate operation of host computer 12 (including the various protocol converters) in response to the major requests/commands by the heterogeneous clients 14a, b, 16 and 18 and host application program 26 to access the shared directories and files in DASD 23. In step 100, client 14a (which is SMB DOS type) makes a request using SMB protocol to create a file with name AAA.BBB and shared access, i.e. the file should be stored in DASD 23 and access permitted to all the clients 14a,b, 16 and 18 and host application program 26. The request also includes a file token which identifies DASD 23 and was obtained by the client previously when the client requested a connection to the resource. The request is passed to protocol converter 34 which supports (i.e. understands) the SMB DOS protocol. Protocol converter 34 calls a processing routine within itself which corresponds to the type of command, and this processing routine handles the command. In this case, the processing routine makes a request using the common API protocol to the file manager, to locate the file name AAA.BBB and return a file token which identifies the file by location (path). Although the protocol converter 34 has the capability to convert a file name in lower case letters to upper case letters, this was not necessary in this example because the file name was submitted by the client in upper case letters only. In response to the request, the file manager reads the directory for the shared files from DASD 23, searches for the file name AAA.BBB, determines that this file name does not exist in the directory, and returns an indication to the protocol converter 34 that the file does not exist (step 104), although it does reserve a token associated with the name and effectively will reserve a "place" for the file if it is later created.

After receiving the return, the protocol converter 34 initiates the next component of the client create request by calling a lock manager program 105 (step 106) which places a lock on the file (step 108). This lock (and all locks established by the lock manager 105 for a request to the shared files) applies to access by any and all clients to the file and file name. The protocol converter determines an appropriate level for the lock based on the client create request parameters, and specifies the level ("access/share status") in the call. This lock is associated with the file name and denies some or all access by all the other clients and application program to the named file, even though the file is not "created" yet. After establishing the lock, the lock manager returns control to the protocol converter 34. Next, the protocol converter initiates the third component of the client create request by calling the file manager to actually create the file (step 110). The file manager then creates the file by making file directory entries and other control block structures for the file name (step 112). A directory entry 113 indicates the existence of file AAA.BBB in DASD 23, although the file does not yet have any data in it, just a file name. After creating the file, the file manager returns control to the protocol converter 34 which returns control to the client (step 114).

Soon afterwards, and while the lock of step 108 is still in place, the client 14a makes a request to the protocol converter 34 to write data into file AAA.BBB, and supplies the data which is to be written (step 116). The protocol converter calls the file manager with a write request and supplies a pointer to the data in the data buffer and an offset into the file at which the data should be stored (step 118). The file manager then determines a location in DASD 23 to store the file data and calls a DASD controller 119 to write the data from the location in the data buffer specified by the protocol converter to the location in DASD 23 determined by the file manager based on the file offset, and then returns control to the protocol converter (step 120). After the action of the DASD controller, the file name AAA.BBB and file data are stored in DASD 23 (status 121). The protocol converter then returns control to the client (step 124) which makes a request to protocol converter 34 to close the file AAA.BBB (step 130). In response, the protocol converter calls the file manager to close the file AAA.BBB (step 132), and the file manager closes the file by completing the writing of data yet unwritten from the previous write request, and updating the aforesaid directory entry and control blocks (step 134). Then, the file manager returns control to the protocol converter, and the protocol converter calls the lock manager to unlock file AAA.BBB (step 136). The lock manager removes the lock and then returns control to the protocol converter (step 138) which returns control to the client (step 140). If the lock was an exclusive lock, any other client or host application program can now access the file name and file data.

Subsequently, client 14b makes a request (using SMB OS/2 1.2 protocol) to protocol converter 34 to open file AAA.BBB (step 150). This step assumes that client 14b previously learned of the existence of file AAA.BBB, for example, from another user. However, step 150 could have followed a request by client 14b to read the directory in DASD 23 for the shared files to learn of file AAA.BBB as described below in steps 290–318. In response to the call, protocol converter 34 determines if client 14b is authorized to access file AAA.BBB (step 152). This determination is required because client 14b did not create file AAA.BBB and is based on an authorization file for this client. Next, protocol converter 34 calls the lock manager 105 to place a lock on file AAA.BBB. The type of lock is read and share and is based on a parameter in the client request corresponding to the nature of the subsequent access contemplated by the client to read the file. The lock manager establishes the lock and returns to the protocol converter 34 (step 154). Then, the protocol converter 34 calls the file manager to open file AAA.BBB (step 156), and the file manager complies by initializing access to the file, creating tokens for later access and updating the aforesaid directory entry and control blocks (step 158). Then, the file manager returns control to the protocol converter 34 which returns control to the client 14b (step 159).

After receiving the return, the client 14b proceeds to make a read request for file AAA.BBB to protocol converter 34 (step 170). In response, the protocol converter calls the file manager to read the data in file AAA.BBB (step 172), and the file manager determines the location of the file by the aforesaid directory entry and control blocks, and calls the DASD controller 119 to read the contents of this location into data buffer 115 (step 174). The read request does not change the contents of file AAA.BBB (status 176).

After completing the read access, client 14b now makes a request to protocol converter 34 to close file AAA.BBB (step 180), and protocol converter 34 calls the file manager to close the file (step 182). The file manager complies by updating the aforesaid directory entry and control blocks (step 184). Then, the file manager returns to the protocol converter, and the protocol converter calls the lock manager to unlock file AAA.BBB (step 186). The lock manager removes the lock on file AAA.BBB, and then returns to the protocol converter (step 188), which returns to the client 14b (step 190). This concludes one instance of access by client 14b to the shared files.

Next, client 16 (which exhibits NFS protocol) makes a request to host computer 12 to create a file with a file name CCCC.DDDD parameter and shared access parameter with the request (step 200). The request is received by a routing process 201. The routing process determines the type of client based on the communication path over which the request is received, and passes the request to a type of protocol converter corresponding to the type of client. In this example, the client exhibits NFS protocol, and therefore the routing process passes the request to protocol converter 36. In response, protocol converter 36 determines if client 16 has the authority to access DASD 21 (step 202). Then protocol converter 36 calls the file manager 30 to locate the file name CCCC.DDDD to determine if the file name has already been used. In response, the file manager searches the directory for the shared files and determines that this file name CCCC.DDDD is available (step 204), and then returns to the protocol converter 36. Next, the protocol converter 36 calls the lock manager to lock the file name even though the file CCCC.DDDD is not created yet (step 206). The lock manager 105 places a lock on the file and then returns to the protocol converter 36 (step 208). Next, the protocol converter calls the file manager 30 to actually create the file (step 210), and the file manager creates the file by creating another directory entry and associated control blocks (step 212). Then, the file manager returns to the protocol converter, which returns to the client (step 216). At this time, the shared files include the file name CCCC.DDDD but no data for this file (status 214).

Soon after receiving the return, client 16 makes a request to host computer 12 to write into file CCCC.DDDD and includes the data (step 220). The routing process 201 passes the request to protocol converter 36 which calls the file manager 30 to write the data into file CCCC.DDDD (step 222). In response, the file manager determines the location of file CCCC.DDDD, and then calls the DASD controller 119 with the data and address (step 224), and the DASD controller writes the data into file CCCC.DDDD. At this time, the shared files include file name CCCC.DDDD and the associated data, as well as file name AAA.BBB and the associated data (status 226). Then, the file manager returns to the protocol converter 36 which calls the file manager to close file CCCC.DDDD (step 228). It should be noted that according to NFS protocol, the client does not supply either an open or close command; the open and close command are presumed to precede and follow each write operation. (This contrasts with SMB protocol in which the SMB client must supply the close command after a write command as illustrated in step 130 above). The file manager closes the file and then returns to the protocol converter 36 (step 230). Next, the protocol converter calls the lock manager to unlock file CCCC.DDDD (step 232). The lock manager complies and returns to the protocol converter (step 234), and the protocol converter returns to the client (step 236).

Subsequently, the client 14b makes a request to protocol converter 34 to open file CCCC.DDDD (step 240). This presumes that client 14b previously learned of the existence of file CCCC.DDDD. It should be noted that the SMB client 14b can open (and subsequently read from or write to) a file that was created and written by the NFS client 16. In response to the call, protocol converter 34 determines if client 14b has authority to access file CCCC.DDDD (step 242). If so, protocol converter 34 calls the lock manager 105 to lock file CCCC.DDDD, and the lock manager locks the file and returns to the protocol converter (step 244). Then, the protocol converter calls the file manager to open file CCCC.DDDD (step 246), and the file manager complies by accessing the file directory entry (step 248). Then, the file manager 248 returns to the protocol converter 34 which returns to the client (step 250).

After receiving the return, client 14b makes a write request to protocol converter 34 and includes data and the file name CCCC.DDDD parameter (step 260). The data can be additional data for the file CCCC.DDDD, a change of the existing data, or deletion of the existing data. In response, the protocol converter calls the file manager 30 to write the data into the named file (step 262), and the file manager determines the location of the file in DASD 23 and calls the DASD controller 119 supplying the data and address (step 264). The DASD controller writes the data into DASD 23, and the result is indicated as data ' (status 266). Then, the file manager returns to the protocol converter 34, and the protocol converter returns to the client (step 268). Next, the client 14b makes a close request to protocol converter 34 for file CCCC.DDDD (step 270), and protocol converter 34 calls the file manager 30 to close file CCCC.DDDD (step 272). In response, the file manager closes the file CCCC.DDDD and then returns to the protocol converter (step 274). Next, the protocol converter, calls the lock manager to unlock file CCCC.DDDD (step 276), the lock manager complies and returns to the protocol converter (step 278), and the protocol converter returns to the client (step 280).

Subsequently, client 14b makes a request to protocol converter 34 to list all shared files (which request is similar in concept to a request to read the directory for the shared files) (step 290). In response, the protocol converter determines if client 14b has the authority to access all the files (step 292). Assuming client 14b has such authority, the protocol converter calls the file manager for a token for the search directory. The token is the file manager's representation of the directory to be searched. The file manager associates the shared file directory with the token by internal control blocks of the file manager, and then returns to the protocol converter (step 294). Next, the protocol converter calls the lock manager to lock the search directory (step 296), and the lock manager complies and returns to the protocol converter (step 298). Next, the protocol converter calls the file manager to read the directory into data buffer 115 for access by the file manager (step 296). In response, the file manager determines the location of the directory, and sends a read command, the DASD address to read from and the data buffer address to receive the data, to the DASD controller 119 (step 302), and then the DASD controller performs the read operation. Then, the file manager returns to the protocol converter and provides the address in the data buffer 115 that stores the directory. Next, the protocol converter calls the lock manager to unlock the search directory (step 306), and the lock manager complies and returns to the protocol converter (step 308). Next, the protocol converter calls the file manager to release the search token (step 310), and the file manager disassociates the search token with this directory, and returns control to the protocol converter (step 312). Next, the protocol converter compares the file names read from DASD 23 to search criteria specified by the client 14b in the search request (i.e. list all files) in step 290 (step 314). The search criteria can be a specific file, all files or all files with certain characters in their names. Then, the protocol converter sends the file names that meet the criteria to the client, and returns control to the client (step 316). These file names are AAA.BBB and CCCC.DDDD. It should be noted that SMB client 14b is able to read the file name CCCC.DDDD that was created by NFS client 16 (and write to the file data as described above and read from the file data).

Subsequently, the client 14b makes a request to protocol converter 34 to rename file CCCC.DDDD to file name XXXX.YYYY (step 320). File CCCC.DDDD was created by client 16. In response, protocol converter 34 determines if client 14b is authorized to access this file, and then calls the file manager 30 to associate tokens with the directory and both old and new file names (this is actually three separate file manager calls) (step 321). The file manager then associates the directory and file names with tokens, and returns the tokens to the protocol converter (step 322). Next, the protocol converter calls the lock manager to lock the directory (step 323), and the lock manager complies and returns an acknowledgement (step 324). Next, the protocol converter calls the file manager to change the file name CCCC.DDDD to XXXX.YYYY (step 325), and the file manager complies by changing the entry in the directory and the associated control block (step 326), and returns control. Then, the protocol converter calls the file manager to return the token (step 330), and in response, the file manager releases the directory and file tokens such that the tokens are no longer associated therewith, and returns control to the protocol converter (step 331). Finally, the protocol converter returns control to the client with an acknowledgement that the file has been successfully renamed (step 332).

Subsequently, the host application 26 makes a request to protocol converter 46 to open file AAA.BBB (step 338). In response, the protocol converter determines if host application 26 is authorized to access file AAA.BBB, and assuming this is the case, calls the file manager to obtain a token for the file (step 339). The file manager associates the token with the file, and returns the token to the protocol converter (step 340). Next, the protocol converter calls the lock manager to lock the file (step 341), and the lock manager complies and returns control to the protocol converter (step 342). Next, the protocol converter calls the file manager to actually open the file (step 343). The file manager opens the file and returns control (step 344). Finally, the protocol converter returns control to the host application with an indication that the file has been opened (step 345).

Soon afterwards, the host application 26 makes a request to the protocol converter 46 to write to file AAA.BBB that was just opened (step 350). The host application 26 provides the data with the request, and the data is temporarily stored in the data buffer 115. In response to the call, the protocol converter calls the file manager to write the data into DASD 23 (step 352), and the file manager complies with assistance from the DASD controller 119 and returns to the protocol converter (step 353). Then, the protocol converter returns to the host application with an indication that the data has been written successfully (step 354). Next, the host application makes a request to protocol converter 46 to close file AAA.BBB (step 355). In response, the protocol converter calls the file manager to close the file (step 356). The file manager complies and returns control (step 357). Next, the protocol converter 358 calls the lock manager to unlock file AAA.BBB (step 358), and the lock manager complies and returns control (step 359). Next, the protocol converter calls the file manager to return the token associated with file AAA.BBB (step 360), and in response, the file manager disassociates the file from the token and returns to the protocol converter (step 361). Finally, the protocol converter returns control to the host application with an indication that the file has been successfully closed (step 362).

Subsequently, NFS client 16 makes a request to the host computer 12 to delete file AAA.BBB which was created by SMB client 14a (step 366). The routing process 201 routes the request to the corresponding protocol converter 36, which calls the file manager 30 to obtain a token for the file AAA.BBB (step 367). The file manager associates a token with the file and returns it and control to the protocol converter (step 368). Next, the protocol converter 370 calls the lock manager to lock file AAA.BBB for deletion (step 370). Because the file will be deleted, the lock manager places an exclusive lock on the file, and then returns to the protocol converter (step 359). Next, the protocol converter calls the file manager to delete the file (step 374), and the file manager complies by erasing the file name AAA.BBB from the directory, erasing the associated control block, and erasing the data from the file (step 375). Next, the protocol converter calls the lock manager to unlock the file AAA.BBB (step 378), and the lock manager complies and returns control (step 379). Next, the protocol converter calls the file manager to return the token for file AAA.BBB (step 380), and the file manager disassociates the file from the token and returns control (step 381). Finally, the protocol converter returns control to the client 16 with an indication that the file AAA.BBB has been deleted (step 382).

In accordance with another object of the present invention, each of the clients 14a,b, 16 and 26 can also access their private DASDs 21,21, 22 and 20, respectively, using the same flows illustrated in FIGS. 2(a–e). The only differences to the flows are that the client requests to create and list the private files specify one of the private DASDs (instead of shared access), each private file and directory is stored in the respective private DASD, and each private DASD does not include any files created by clients of the other types. The private files and file names within one DASD can only be accessed by clients of the one type.

FIGS. 3(a–e) illustrate the protocol converter 34 function in more detail. In step 400, a remote request is received from one of the SMB clients 14a or 14b, through a communications routing function such as APPC/VM or directly through CP channel management. When the request is received, the protocol converter invokes the appropriate handler routine for the type of remote request (step 402).

A request to create a file is routed to an entry point 404 and then a decision 414 in which the protocol converter 34 determines if the client is authorized to add files to the shared files system, both in general and in particularly within a specified directory. If the client is not so authorized, then the protocol converter responds to the client with a failure indication-permission denied. However, if the user has the appropriate authorization, then the protocol converter folds the file name to upper case letters if the file name is submitted in lower case letters to conform to the data format of the shared files (step 416). Then the protocol converter calls the file manager to locate the file and return a handle or token based on the name (step 418). If the file already exists (decision 420), then the protocol converter responds to the client with a failure indication and performs appropriate cleanup, including a call to the file manager to return the token associated with the file (step 421). If the file does not already exist, then the protocol converter makes a call to the lock manger to lock the file token and structures associated with the file (step 422). Next, the protocol converter calls the file manager to create the file (step 423). If the file was successfully created (decision 424), then the protocol converter responds to the client with an indication of success and with the file attributes. However, if the file was not successfully created, then the protocol converter responds to the client with an indication of failure only.

Figure 3B:
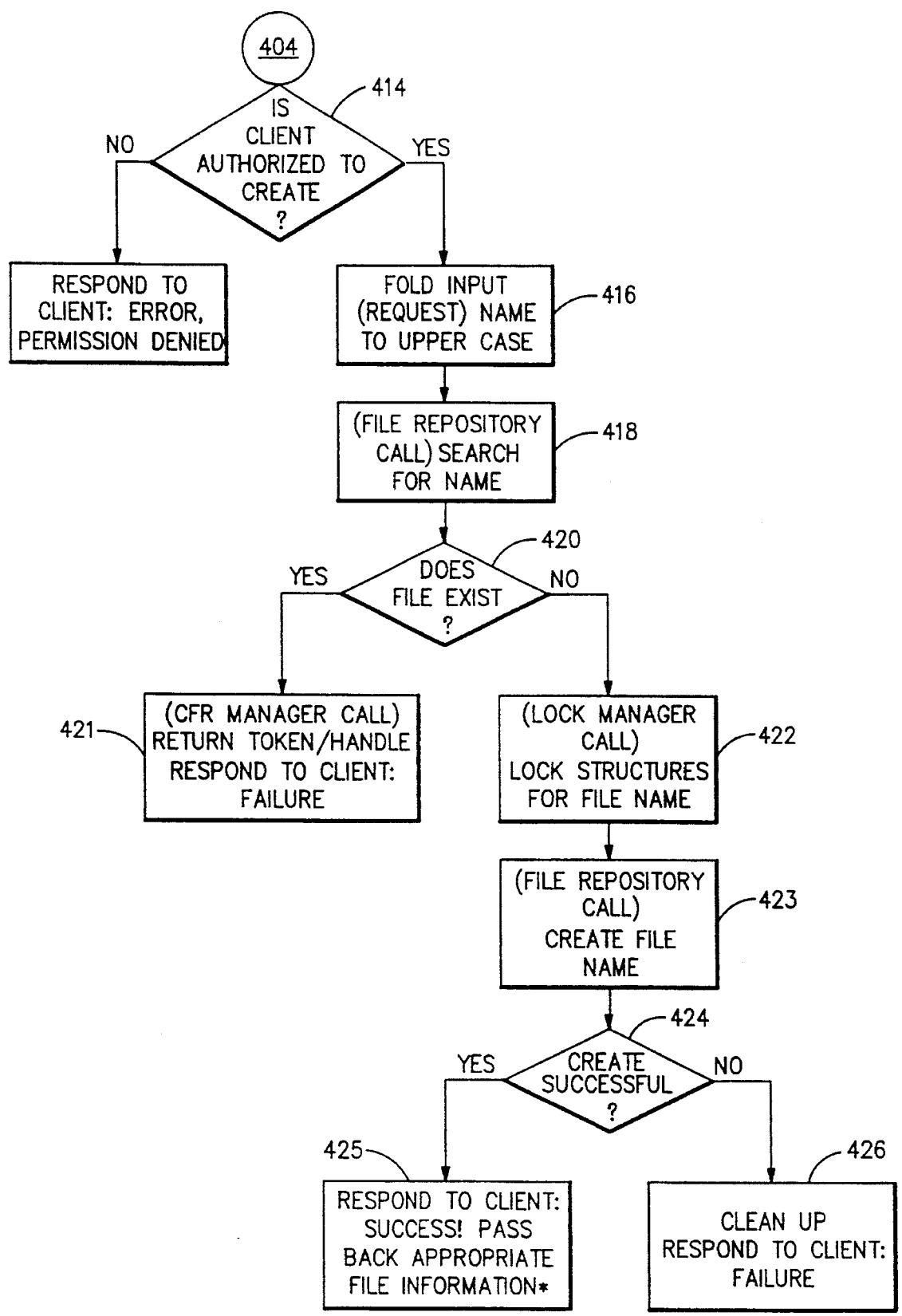
Figure 3C:
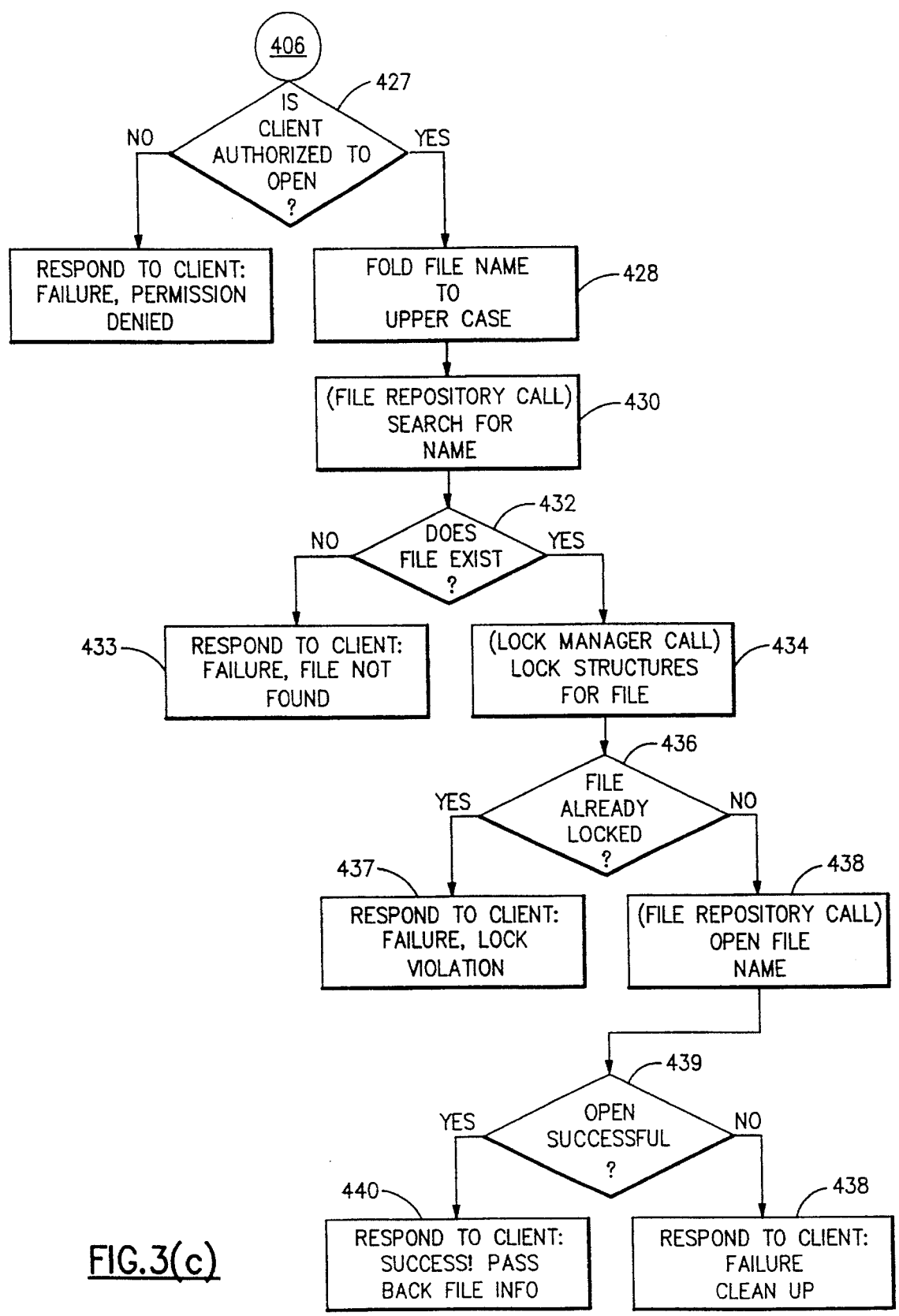
Figure 3D:
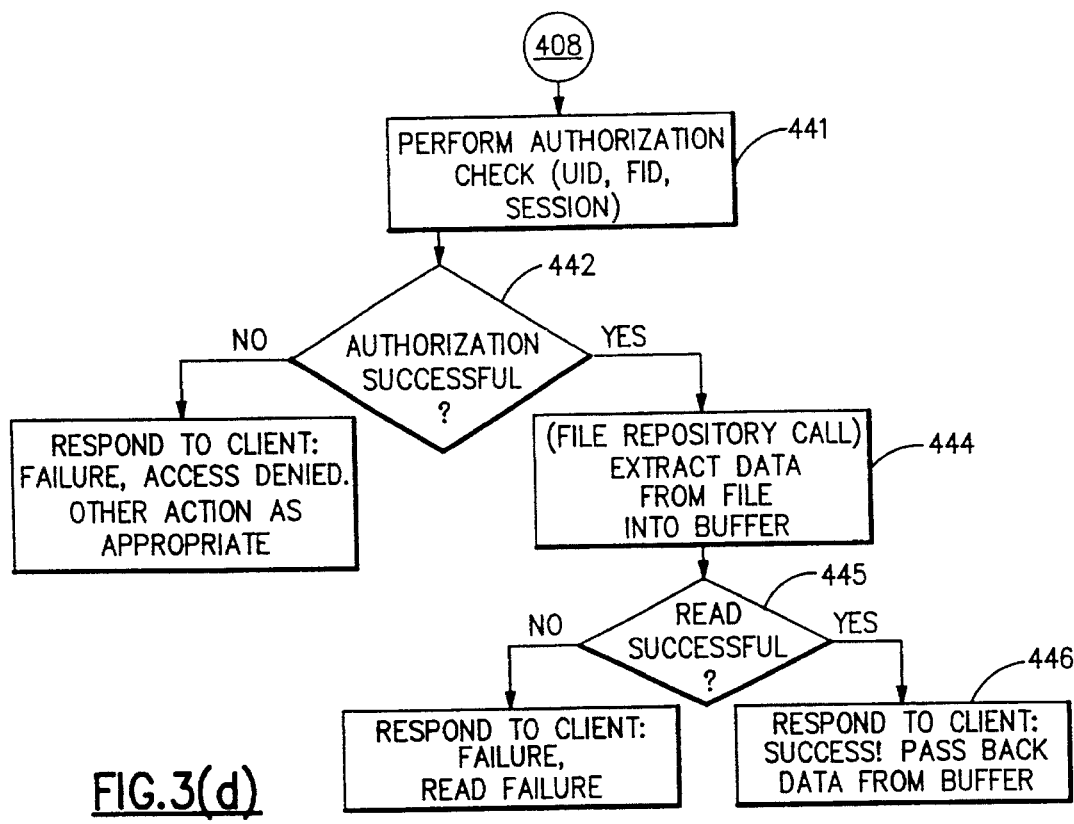
Figure 3E:
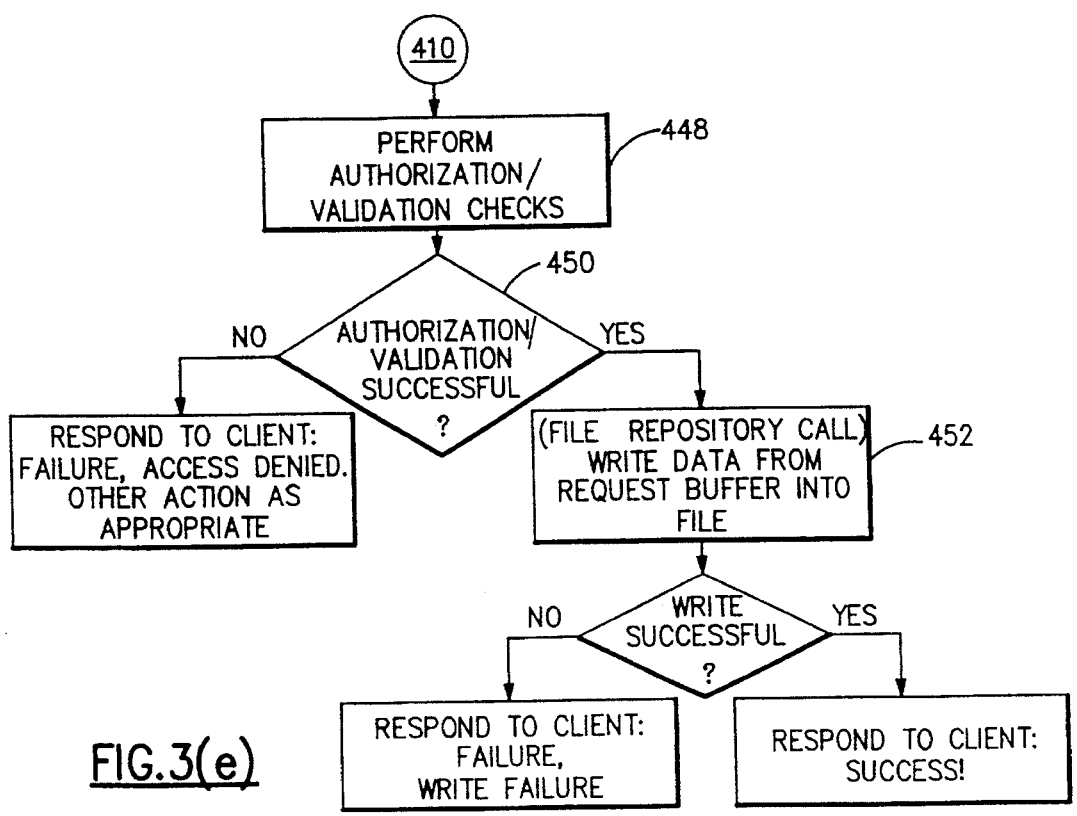
Figure 3F:
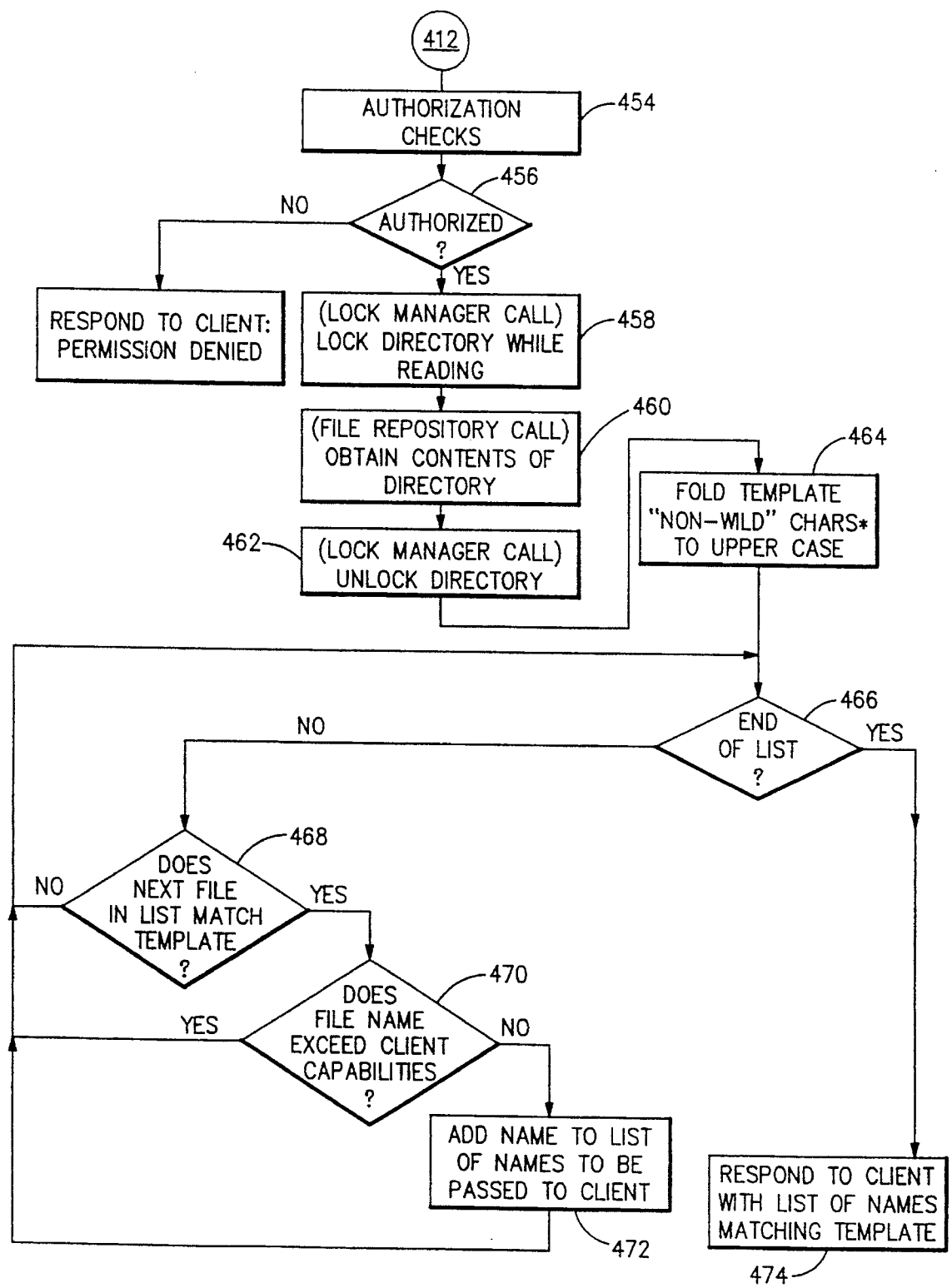

Referring again to FIG. 3(a), a request to open a file is routed to an entry point 406 and then a decision 427 of FIG. 3(c) in which the protocol converter determines if the client is authorized to open the named file. If not, then the protocol converter responds to the client with a failure indication and denial of permission to open the file. However, if the client is authorized, then the protocol converter folds the file name to upper case if the name of the file to be opened is submitted in lower case letters to conform to the data format of the shared files (step 428). Then, the protocol converter calls the file manger 30 to locate the file and return a handle or token based on the name (step 430). If the file does not exist (step 432), then the file manager so notifies the protocol converter, and the protocol converter passes the response to the client indicating that the file cannot be opened, performs the appropriate cleanup, and calls the file manager to return the token associated with the file (step 433). However, if the file exists, then the open request can be performed and the protocol converter calls the lock manager to lock the file token and structures associated with the file (step 434). If the file is already locked by another client, and the lock excludes access by the client which just made the open request, then the lock manager responds to the protocol converter with a failure indication and the protocol converter passes this response to the client and performs appropriate cleanup (step 437). However, if the lock request is granted, then the protocol converter calls the file manager 30 to open the file (step 438). If the file manager then successfully opens the file (decision block 439), then the file manager indicates such to the protocol converter and the protocol converter passes the response to the client (step 440).

Referring again to FIG. 3(a), a client request to read a file causes the protocol converter 34 to call an entry point 408 within itself. Then, the protocol converter performs a cursory authorization check to ensure that the remote request is legitimate and not an attack by a malicious client on the remote network (step 441). This check is made by comparison of values within the remote request with those known to have been assigned to the user by the protocol converter. Assuming that the client is authorized to make the read request (decision 442), then the protocol converter calls the file manager to extract data from the file to be read and copy the data into the data buffer 115 (step 444). The file to be read in this case is the one that was previously created and opened, and is referenced by the client in the client request by the token or handle that was returned to the client after the create and open requests were executed. The file manager responds to the protocol converter with an indication whether the file manager was successful in reading the data into the data buffer 115. If the file manager was successful (decision 445), then the protocol converter responds to the client with an indication of success and the requested data (step 446).

Referring again to FIG. 3(a), a client request to write into the file is passed to the protocol converter 34, and the protocol converter calls an entry point 410 within itself. The file to be written in this case is the same file that was previously created and opened, and for which the client received a token or handle after execution of the create and open operations. The client provides this token or handle with the write request. Then, the protocol converter performs another cursory authorization check to determine if the client request is legitimate and not an attack by a malicious client on the remote network (step 448). The write request from the client also includes client data which is written into the data buffer 115. Assuming that the client is authorized to make the write request (decision 450), then the protocol converter 34 calls the file manager to write the data from the buffer 115 into the DASD 23 (step 452). The file manager calls the DASD controller 119 to assist in the write operation.

Referring again to FIG. 3(a), a client request to search, i.e. a request to retrieve a list of names of files and other objects within the directory for the shared files, is passed to the protocol converter, and the protocol converter calls an entry point 412 within itself. The search request made by the client includes a template which specifies a pattern that the files must match before being returned to the client. The template contains both characters from an allowed file name character set listed previously and wild cards. The wild cards are characters which are not allowed as part of a file name and have special meaning. In the illustrated embodiment, the wild card characters are "*" (asterisk) and "?" (question mark). An * will match any number of characters whereas a ? will match any one character or no characters. Then, the protocol converter performs the cursory authorization checks described above (step 454), and if the client is authorized to search the directory (decision 456), the protocol converter calls the lock manager to lock the directory against updates while the contents are being read (step 458). This lock is a shared read lock which permits other clients to concurrently read the same directory. Then the protocol converter 34 calls the file manager to obtain the contents of the directory (step 460), and the file manager reads the contents of the directory into data buffer 115 with assistance from the device controller 119. Then, the protocol converter calls the lock manager to unlock the directory (step 462), thereby allowing other clients to update the directory. If one or more of the file names obtained from the directory matches the template, it will be included in the list of files returned to the client pursuant to the client search request. Otherwise, the file name will not be included in the response to the client. The protocol converter 34 then decides if the entire list of entries from the directory has been compared to the template (decision 466), and if so responds to the client with all of the entries which match the template (step 474). However, if the entire list has not been compared to the template, then the protocol converter makes the comparison for the next entry obtained from the directory and if the entry matches the template (decision 468), determines if this entry (in addition to the previous one), will exceed the capability of the client (decision 470). For example, if the client is the DOS client 14a, then the client can only handle file names within the confines of the 8.3 data format. According to this format, each file name includes a period as a separator, and there must be 1–8 characters preceding the period and 0–3 characters following the separator. Therefore, if the file name from the directory exceeds the confines of the client data format, then the file name will not be returned to the client. If not, then this additional entry which matches the client template is returned to the client (step 472). Then, the protocol converter performs the foregoing decisions and steps for the remaining entries received from the directory.

FIGS. 4(a–e) illustrate general operation of the NFS protocol converter 36. In step 500, the protocol converter 36 receives a client request through a communications routing function such as VM IUCV and the routing process 201 which correlates the NFS client to the appropriate protocol converter which in this case is protocol converter 36.

Figure 4B:
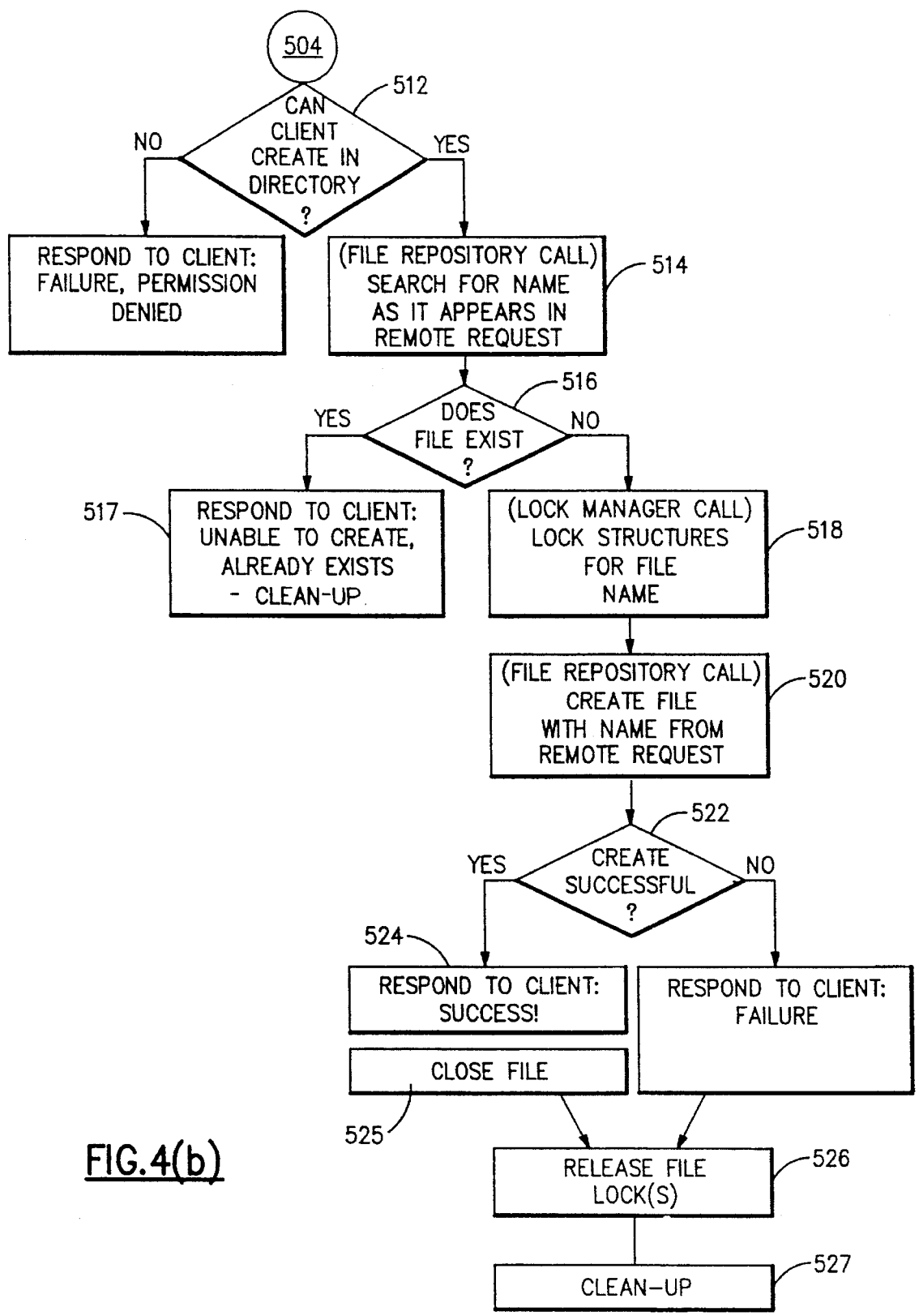
Figure 4C:
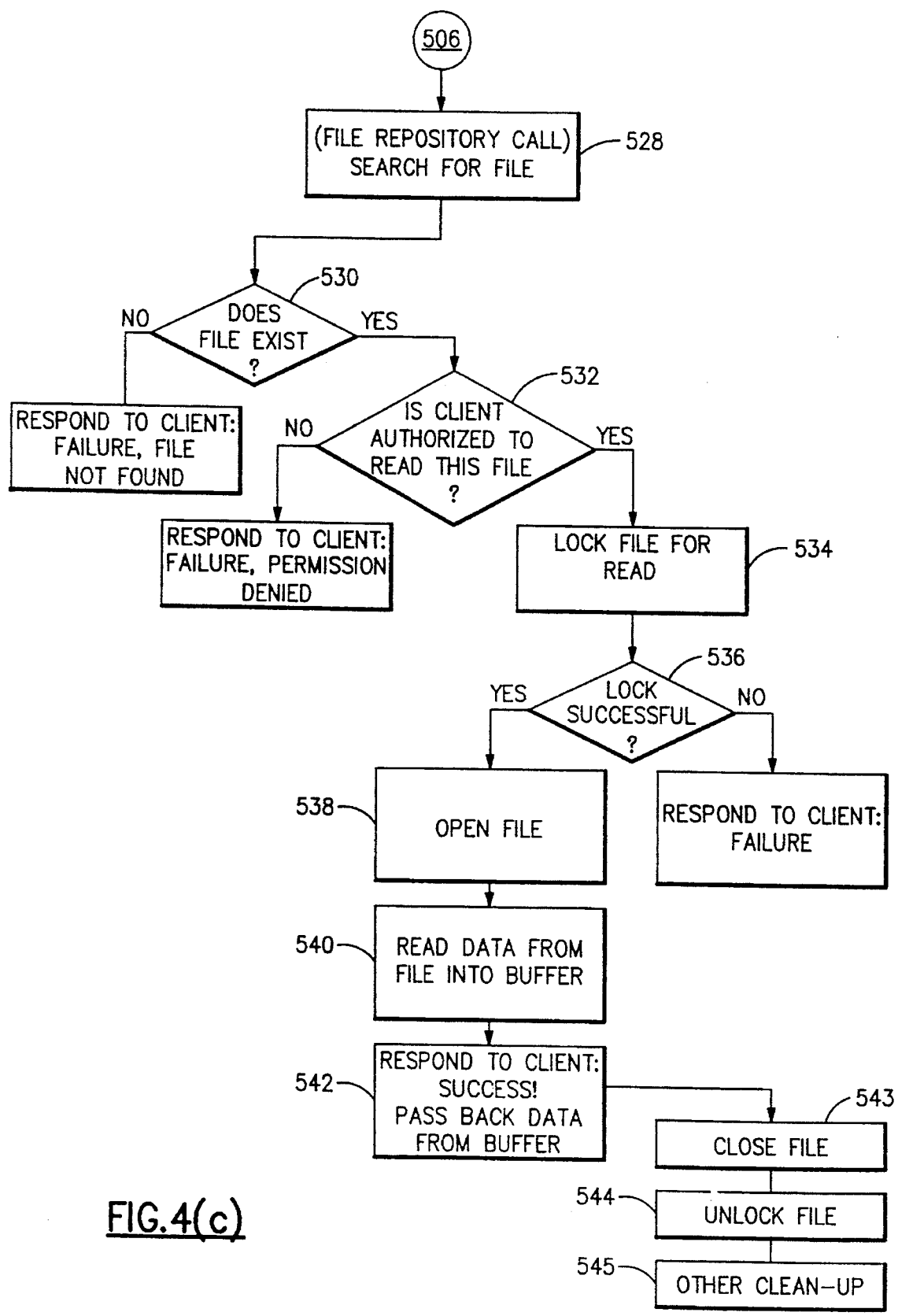
Figure 4D:
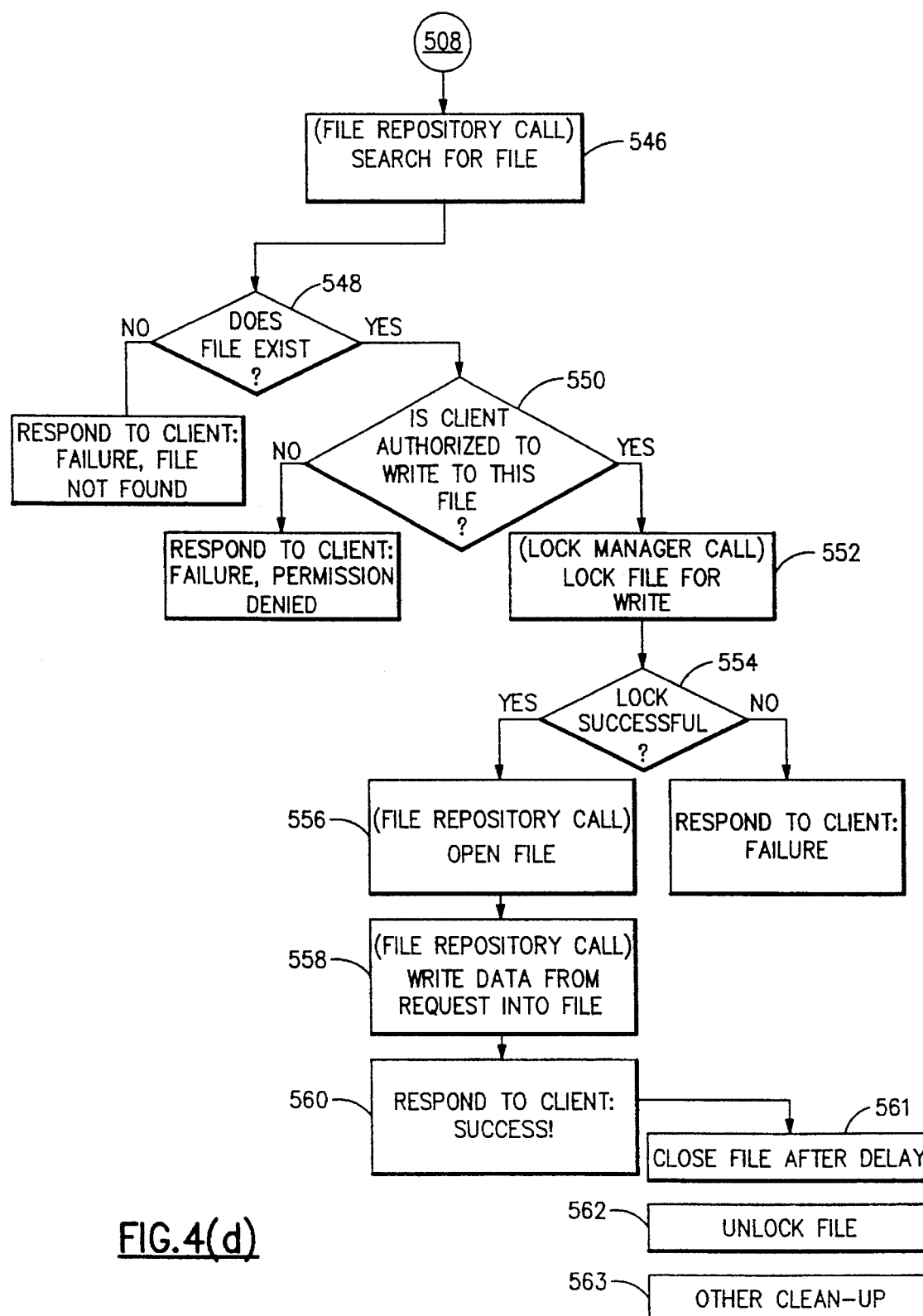
Figure 4E:
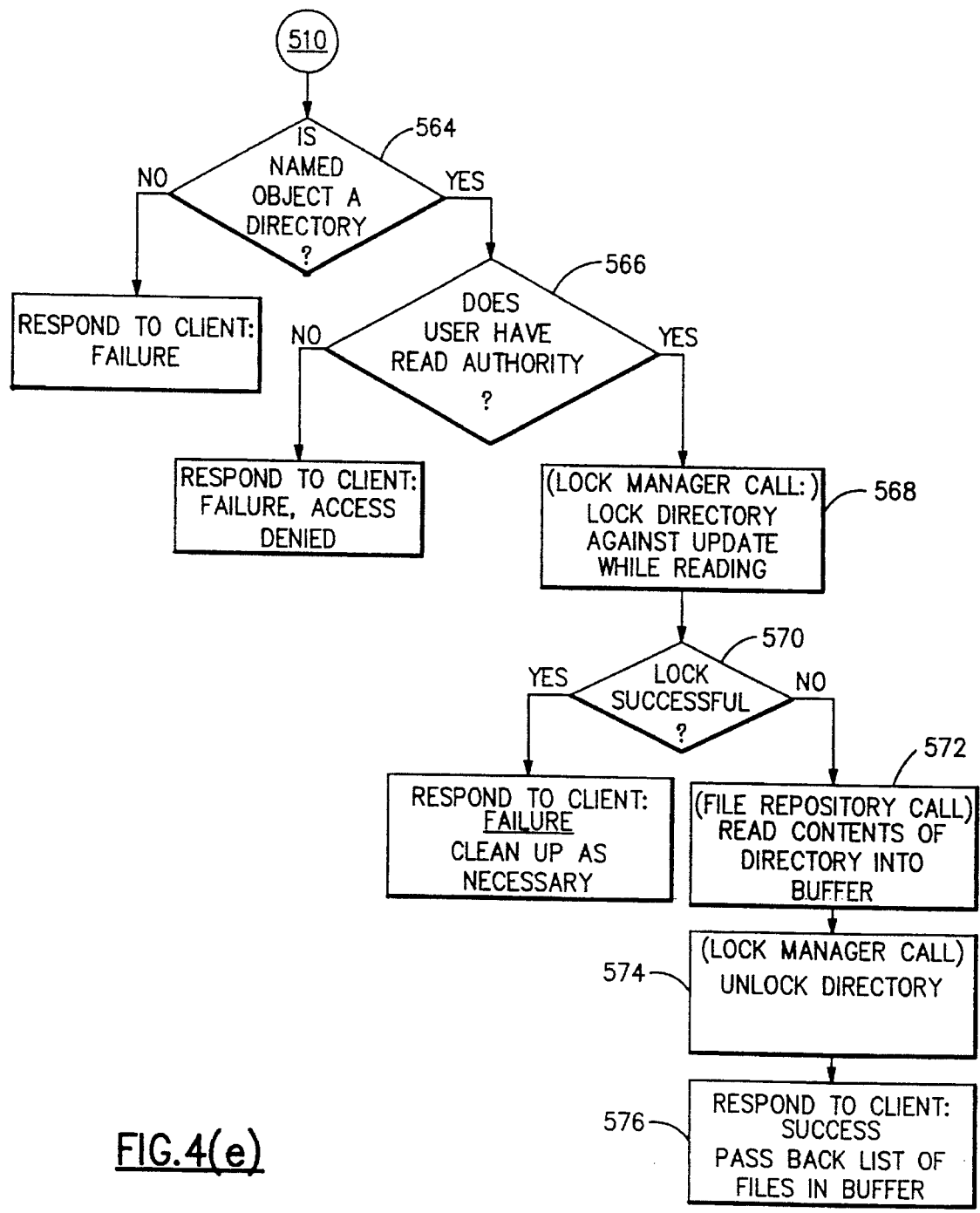

Protocol converter 36 receives a clients request to create a file, and calls a create subroutine at entry point 504 (step 502). Next, as illustrated in FIG. 4(b), the protocol converter 36 determines if this client is authorized to add files to the common file system. For the NFS protocol, the client authorization is checked against the specified directory only. If the client is authorized to create a file in this directory (decision 512), then the protocol converter calls the file manager 30 to locate the file and return a handle or token based on the name (step 514). If the file name already exists, then the file manager returns an error indication. However, if the file name has not already been used, then the file manager returns an indication of availability of the file name and a handle or token associated with the file name, and the protocol converter proceeds to call the lock manager with a request to lock the file name (step 518). After the lock is obtained, the protocol converter calls the file manager to actually create the file (step 520), and if the file is successfully created (decision 522), then the protocol converter responds to the client with an indication of success and the file token question mark (step 524). Then, the protocol converter calls the file manager to close the file (step 525), and then calls the lock manager to unlock the file (step 526). Finally, the protocol converter calls the file manager to return the handle associated with the file name (step 527) so that other clients can access the file. It should be noted that according to the NFS protocol, each client request is considered to be atomic and self contained whereby files are automatically opened before performing these specific client requests and then closed after performing these specific client requests. In contrast, according to the SMB protocol, when a file is opened by a client it remains open so that the client can subsequently request a read or write operation (without repeating the open operation), until specifically closed by the client. It should also be noted that protocol converter 36 can be optimized by installing a delay before each call to the file manager to close a file. This delay provides time for the client to make another write or read request to the same file before the file is closed. In such a case, unnecessary file closes and file opens are avoided.

Referring again to FIG. 4(a), a client requests to read from a file is received in step 500, and the protocol converter calls the read subroutine 506 (step 502). Then, the protocol converter 36 calls the file manager 30 to locate the file and return a token or handle based on the file name (step 528). The client request includes a token or handle which identifies the file. If the file exists (decision 530), then the protocol converter determines if the client is authorized to access this file (decision 532). If so, then the protocol converter calls the lock manager to lock the file for reading, i.e. other clients can also read but not update the file concurrently (step 534). It should be note that the use of the common lock manager 105 for all of the shared files by all of the protocol converters 34, 36, 38 and 46 facilitates sharing of the common files and the common directory. If the lock was successfully established (decision 536), then the protocol converter calls the file manager to open the file (step 538). Next, the protocol converter 36 calls the file manager to read data from the file into the buffer 115 (step 540). After the file manager copies the data into the data buffer with assistance from the DASD controller 119, then the protocol converter returns the data to the client (step 542). Then, the protocol converter calls the file manager to close the file and then calls the lock manager to unlock the file (step 544). Finally, the protocol converter performs other cleanup, i.e. freeing control blocks and other working storage (step 545).

Referring again to FIG. 4(a), a client request to write to a file is passed to the protocol converter 36, and the protocol converter calls its write subroutine at entry point 508 (step 502). Then, the protocol converter 36 calls the file manger 30 to locate the file and return a token or handle based on the file name contained in the client request (step 546). If the file presently exists (decision 548), then the protocol converter determines if this client is authorized to access this file (decision 550). If so, the protocol converter calls the lock manager to lock the file for a read operation (step 552). The lock manager returns an indication of the success or failure of the lock operation, and if the lock was successfully established on the named file (decision 554), then the protocol converter calls the file manager to open the file (step 556). Next, the protocol converter calls the file manager to write data into the file, which data was supplied with the client request and temporarily stored in the data buffer 115 (step 558). In response, the file manager writes the data into DASD 23 with assistance from the DASD controller 119. Then, the protocol converter responds to the client with an indication of the success of the write operation (step 560) and then calls the file manager to close the file (step 561), and then calls the lock manager to unlock the file (step 562). Finally, the protocol converter performs other cleanup (step 563).

Referring again to FIG. 4(a), a client request to read the directory is received by the protocol converter 36, and the protocol converter calls its read subroutine at entry point 510 (step 502). Then, the protocol converter 36 determines if the named object is in fact a directory (decision 564), and if so determines if the user has authority to read the directory (decision 566). It should be noted that because the NFS data format is the most permissive of the three, that all of the file names within the directory will be ultimately returned to the client. If the client has the requisite authority, then the protocol converter calls the lock manager to lock the directory against updates while it is being read (step 568). If the lock was successful (decision 570), then the protocol converter 36 reads the contents of the directory into the buffer 115 (step 572). Then, the protocol converter calls the lock manager to unlock the directory to allow other clients to update the directory (step 574). Finally, the protocol converter returns to the client all of the entries within the directory (step 576).

FIGS. 5(a–e) illustrate general operation and function of protocol converter 46 according to the present invention. In step 600, protocol converter 46 receives a request from host application 26, possibly through a communications routing function such as APPC/VM. In step 602, protocol converter 46 routes the request to a corresponding handler which handler begins execution at a respective entry point.

Figure 5A:
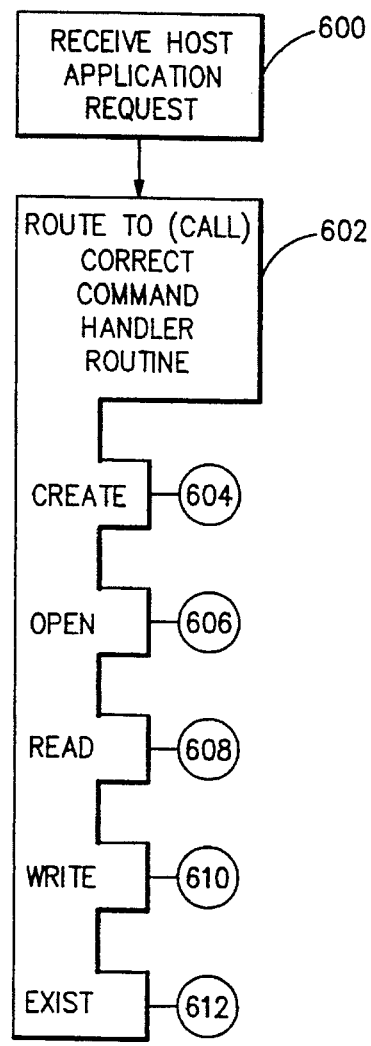
FIGS. 5(a–e) is a flow chart which illustrates general operation of a CMS type of protocol converter within the file manager of FIG. 1.
Figure 5B:
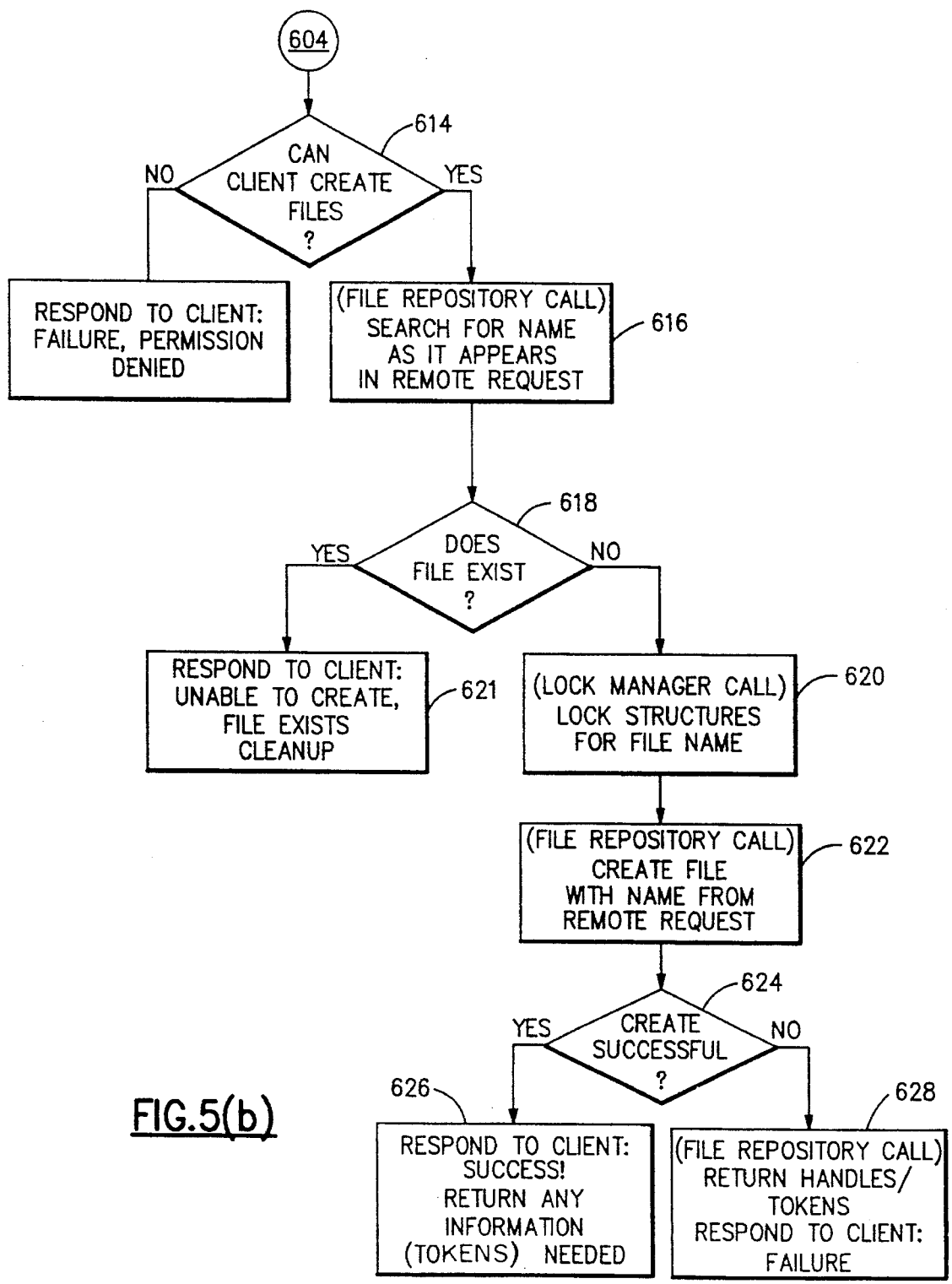

FIG. 5(b) illustrates the request handler within the protocol converter 46 for a create request. The request handler begins at entry point 604, and then the protocol converter 46 determines if the host application is authorized to add a file to the file repository, both in general and with respect to the directory specified in the request. If the host application has such permission, then the protocol converter calls the file manager 30 to locate the file and return a handle or token corresponding to the file name (step 616). If the file name is not available, i.e. the file name is already being used, then the file manager returns an error, and the protocol converter passes the error to the client and performs appropriate cleanup including a call to the file manager to return the token associated with the file name (step 621). However, if the file is available, then the protocol converter calls the lock manager to lock the file token and structures associated with the file (step 620). Then, the protocol converter 36 calls the file manager to create the file (622). If the file is successfully created (decision 624), then the protocol converter responds to the client with an indication of success, and returns any tokens or other information needed by the client (step 626). However, if the file has not been created, then the protocol converter calls the file manager to return the handle or token, and responds to the client with an indication of the error (step 628).

Figure 5C:
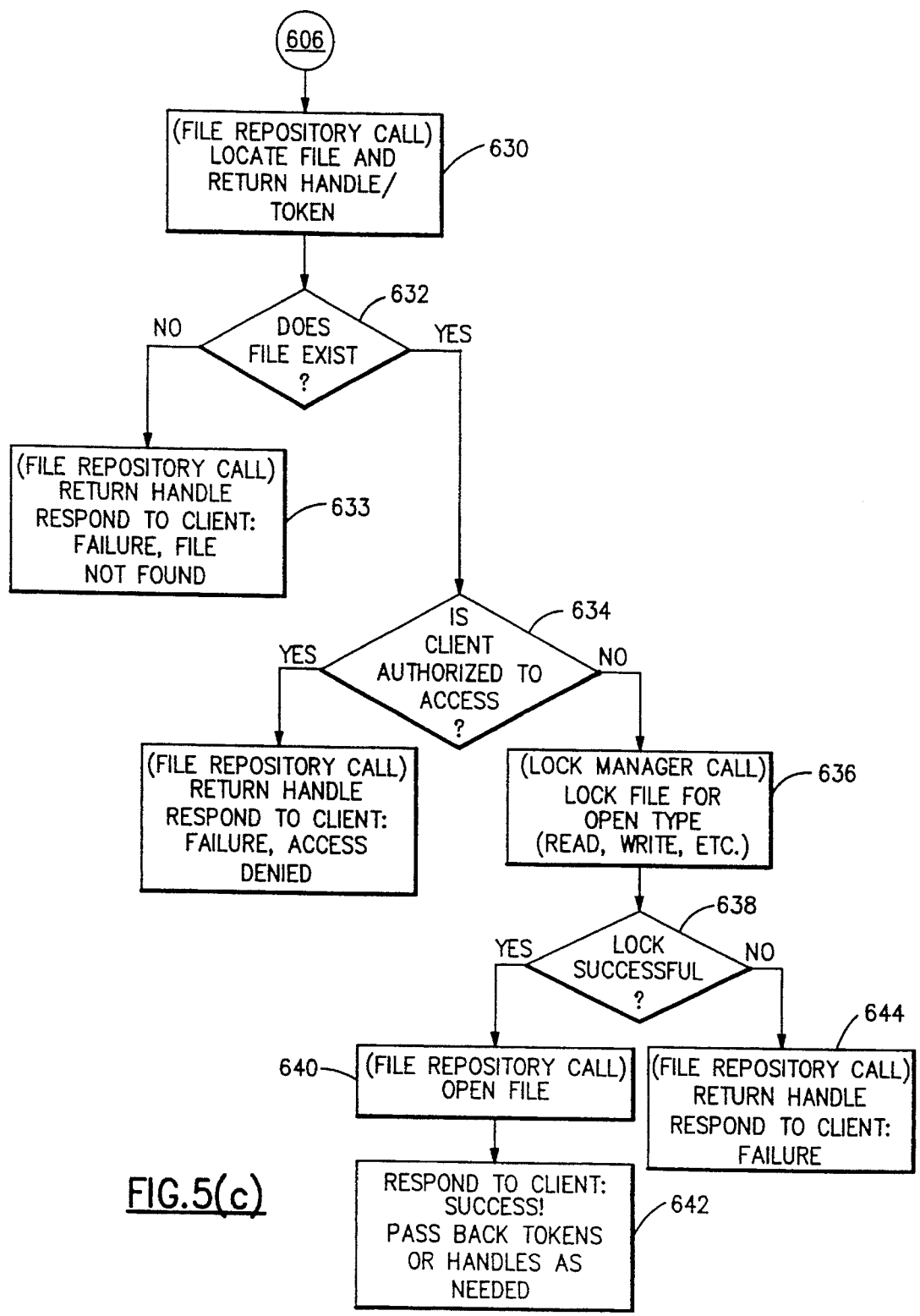
Figure 5D:
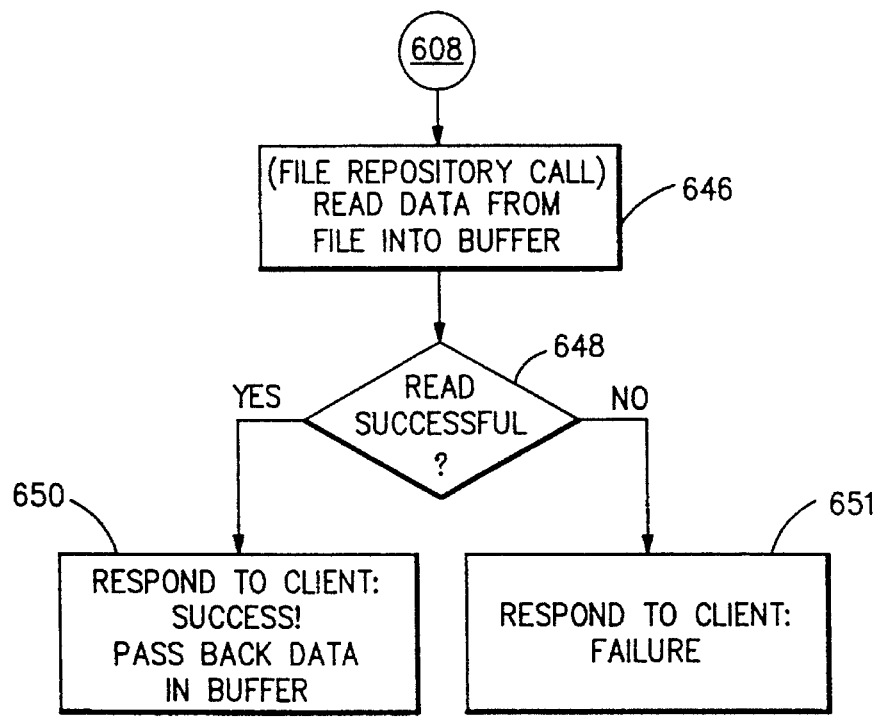
Figure 5D:
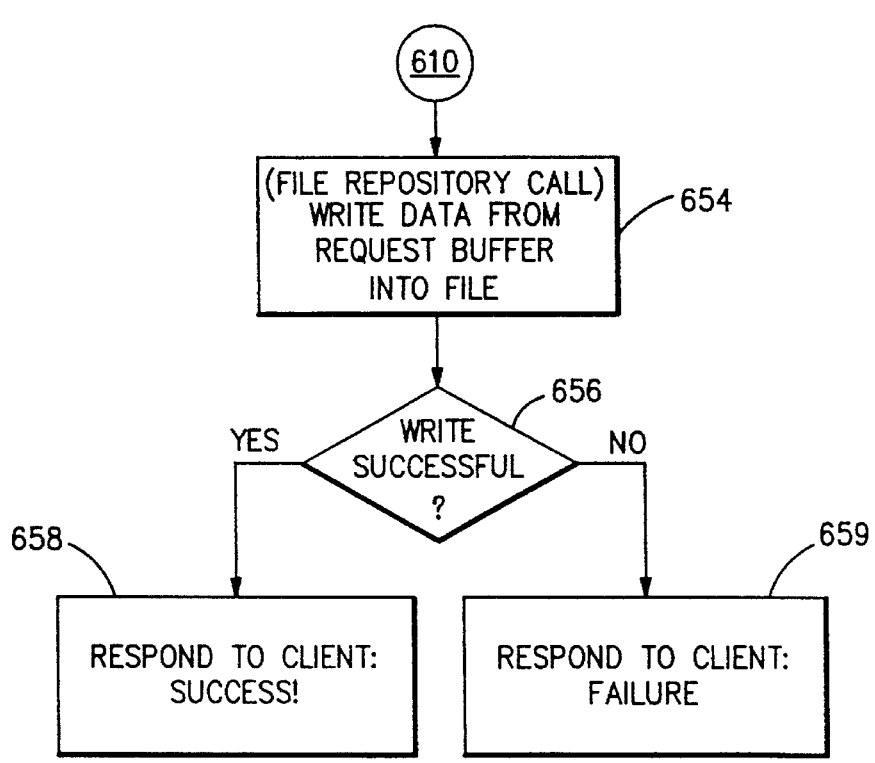
Figure 5E:
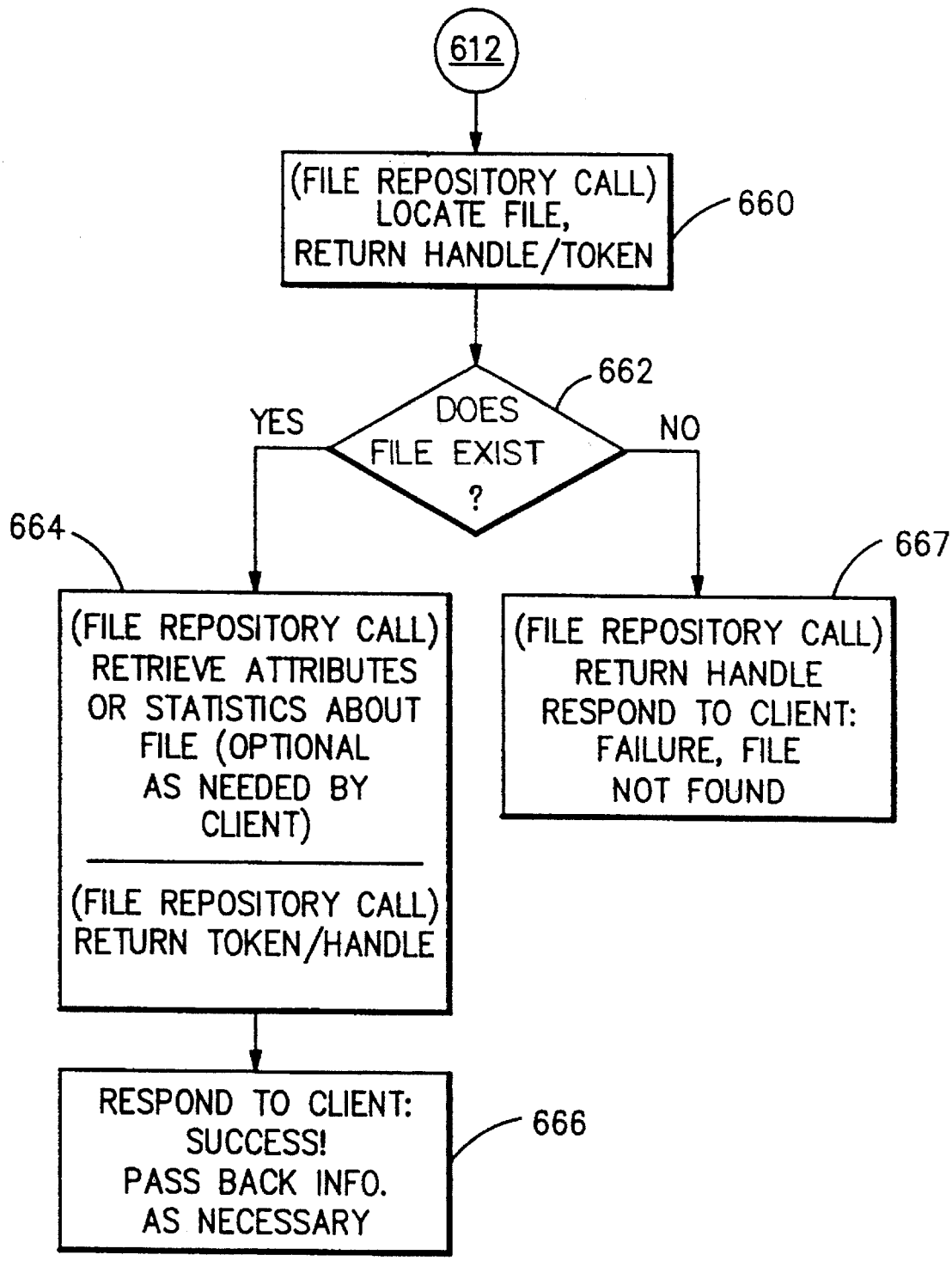

Referring again FIG. 5(a), a request by host application 26 to locate a file and return a handle or token based on the file name is received by the protocol converter 46 (step 600), and routed to an open subroutine which begins at entry point 606. As illustrated in FIG. 5(c), the protocol converter 46 next calls the file manager 30 to locate the file and associate a token with it (step 630). If the file does not currently exist (decision 632), then the protocol converter responds to the client with an indication of failure, and performs appropriate cleanup including a call to the file manager to return the token associated with the file name (step 633). However, if the file currently exists, then the protocol converter determines if the host application is authorized to open the file (decision 634). If the host application is authorized, then the protocol converter calls the lock manager to lock the file token and structures associated with the file (step 636). However, if the file is already locked to the exclusion of the host application 26, then the protocol converter responds to the host application with an indication of failure and performs appropriate cleanup, i.e. returning tokens and unlocking the file (step 644). However, if the lock operation is successful, then the protocol converter calls the file manager to open the file (step 640), responds to the host application with an indication of success of the open operation, and passes to the host application the token or handle associated with the file name (step 642).

Referring again to FIG. 5(a), a request by host application 26 to read from the file is received by the protocol converter 46 (step 600), and protocol converter 46 then calls the read subroutine which begins at entry point 608. Then, the protocol converter 46 begins the read subroutine by calling the file manager 30 to read the data specified in the request into the data buffer 115 (step 646). In the illustrated example, the file for which the host application requests the read operation is the same file that was previously created and opened, and was referenced by the client in step 600 by the token or handle that was returned to the client after completion of the create and open operations. If the read operation is successful (decision 648), then the protocol converter 46 responds to the client with the data (step 650), but if not, response to the client with an indication of failure (step 651).

Referring again to FIG. 5(a), the protocol converter 46 now receives a request from the client to write to the same file (step 600), and the protocol converter 46 calls the write subroutine which begins at entry point 610. To begin the write subroutine, the protocol converter 46 calls the file manager to write the data included in the host application request to the named file (step 654). In the illustrated example, the file specified in the request is the same file that was previously created, opened and read, and the host application request includes the token or handle that was returned to the client after the create and open requests were completed. If the file manager successfully writes the data into the shared files (step 656), then the protocol converter responds to the client with an indication of success (step 658), but if not, respond to the client with an indication of failure (step 659).

Referring again to FIG. 5(a), the protocol converter 46 receives a request from the host application 26 to verify the existence of a named file (step 600), and the protocol converter 46 calls the exist subroutine which begins at entry point 612. Then, the protocol converter 46 calls the file manager 30 to locate the file and return the handle or token based on the file name (step 660). If the file does not exist, then the protocol converter responds to the client with an indication of failure, and calls the file manager to return the handle or token (step 667). However, if the file exists, then the protocol converter 46 calls the file manager to retrieve information about the file such as the times and dates of access, file attributes, and other statistics and quantities relating to the file (step 664). Finally, the protocol converter responds to the client with an indication of success of the exist request, and also responds with the information about the file (step 666).

Based on the foregoing, a compouter system according to the present invention has been disclosed. However, numerous modifications and substitutions can be made without deviating from the scope of the present invention. For example, other protocol converters for other types of clients can be added. Therefore, the invention has been disclosed by way of illustration and not limitation, and reference should be made to the following claims to detemine the scope of the present invention.

We claim:

1. A computer comprising:

means for storing in a common storage area a multiplicity of data objects having at least two different data formats and a directory listing said data objects;

first and second protocol converter means, coupled to receive requests exhibiting first and second different protocols from first and second clients, respectively, to read said directory, for converting said requests into a common protoco, said first and second clients having respective first and second, different data formats;

file manger means, coupled to receive the converted requests exhibiting said common protocol from both protocol converters, for furnishing to each of said first and second clients a respective list of data objects having names compatible with the respective data format and not furnishing to each of said first and second clients a respective list of data objects not having names compatible with the respective data format;

said first protocol converter means converts and said file manager means executes a request exhibiting said first protocol from said first client to rename a data object in said directory from a name having a data format compatible with the data format of said first client but incompatible with the data format of said second client to another name having a data format compatible with both said first and second clients such that said first and second clients can access said data object with said other name after the renaming.

2. A computer system as set forth in claim 1 further comprising lock manager means, common to both protocol converters and callable by both protocol converters with said common protocol, for locking said directory and all of said data objects throughout said common storage area during access by either of said clients to said directory prevent conflicting access by the other client.

3. A computer system as set forth in claim 1 wherein said protocol converter means convert and said file manager means executes requests by each of said clients to delete a data object created by the other client provided a name of said data object created by said other client has a data format compatible with the data format of the client requesting deletion.

4. A computer system as set forth in claim 1 wherein said file manager means also manages access by said first client to a second storage area for names of other data objects and said other data objects dedicated to said first client and not accessible by said second client.

5. A computer system as set forth in claim 4 wherein said first client makes said requests to said first protocol converter means to access said second storage area using said first protocol and said first protocol converter means converts said requests to requests exhibiting said common protocol and passes the converted requests exhibiting said common protocol to said file manager means for execution.

6. A computer system as set forth in claim 1 wherein said first client exhibits an SMB protocol and said second client exhibits an NFS protocol.

7. A computer system as set forth in claim 1 wherein said file manager means executes within a host computer, said first client is a remote workstation or personal computer and said second client is an application executing within said host computer.

8. A computer system as set forth in claim 1 further comprising routing program means, coupled to receive said requests from said first and second clients exhibiting said first and second protocols, respectively, for routing said requests to said first and second protocol converters, respectively, based on the type of client which makes said request.

9. A system as set forth in claim 1 wherein:

said first and second protocol converter means convert and said file manager means executes requests exhibiting said first and second protocols from said first and second clients, respectively, to read and write files in the respective lists furnished to said first and second clients.

10. A method for managing data access requests by first and second clients exhibiting first and second different, respective communication protocols and first and second respective different, but partially compatible data formats, said method comprising the steps of:

storing data objects and a directory listing said data objects in a common storage area;

converting into a common protocol a request received from said first client to rename a data object created by said second client to a name which is incompatible with the data format of said second client; and executing the converted rename request by changing the name of the respective data object in said directory and subsequently denying access by said second client to said renamed data object even though said renamed data object is still stored in said common storage area.

11. A method as set forth in claim 10 wherein the step of denying access to said second client comprises the step of denying a directory listing of said renamed data object to said second client.

* * * * *